(12) United States Patent
Wong et al.

(10) Patent No.: US 7,739,601 B1
(45) Date of Patent: Jun. 15, 2010

(54) MEDIA AUTHORING AND PRESENTATION

(75) Inventors: Curtis G. Wong, Bellevue, WA (US); Steven M. Drucker, Bellevue, WA (US); Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 10/055,538

(22) Filed: Jan. 23, 2002

(51) Int. Cl.
*G06F 3/00* (2006.01)
(52) U.S. Cl. ........................ 715/731; 715/721
(58) Field of Classification Search .......... 715/720, 715/719, 769, 716, 721–726, 764, 968, 512, 715/530, 501.1, 500, 730–732; 707/104.1, 707/2, 3, 102
See application file for complete search history.

(56) References Cited

U.S. PATENT DOCUMENTS

| | | | |
|---|---|---|---|
| 5,421,332 A | 6/1995 | Ishii et al. | |
| 5,616,876 A | 4/1997 | Cluts | |
| 5,774,591 A | 6/1998 | Black et al. | |
| 5,802,361 A | 9/1998 | Wang et al. | |
| 5,893,095 A | 4/1999 | Jain et al. | |
| 6,366,296 B1 | 4/2002 | Boreczky et al. | |
| 6,389,467 B1 | 5/2002 | Eyal | |
| 6,490,370 B1 | 12/2002 | Krasinski et al. | |
| 6,526,411 B1 | 2/2003 | Ward | |
| 6,567,980 B1 * | 5/2003 | Jain et al. | 725/61 |
| 6,642,940 B1 | 11/2003 | Dakss et al. | |
| 6,721,706 B1 | 4/2004 | Strubbe et al. | |
| 6,721,741 B1 | 4/2004 | Eyal et al. | |
| 6,721,952 B1 | 4/2004 | Guedalia et al. | |
| 6,792,573 B1 * | 9/2004 | Duncombe | 715/500.1 |
| 6,813,745 B1 * | 11/2004 | Duncombe | 715/500.1 |
| 6,877,002 B2 | 4/2005 | Prince | |
| 6,933,433 B1 | 8/2005 | Porteus et al. | |
| 6,993,532 B1 | 1/2006 | Platt et al. | |
| 7,080,392 B1 | 7/2006 | Geshwind | |
| 7,089,239 B1 | 8/2006 | Baer et al. | |
| 7,111,009 B1 | 9/2006 | Gupta et al. | |
| 7,113,999 B2 | 9/2006 | Pestoni et al. | |
| 7,283,992 B2 | 10/2007 | Liu et al. | |
| 7,319,806 B1 | 1/2008 | Willner et al. | |
| 7,383,314 B1 | 6/2008 | Yoon et al. | |
| 2001/0010523 A1 | 8/2001 | Sezan et al. | |
| 2001/0053275 A1 | 12/2001 | Adachi et al. | |

(Continued)

OTHER PUBLICATIONS

OA Dated Dec. 31, 2008 for U.S. Appl. No. 11/009,115, 24 pages.

(Continued)

*Primary Examiner*—Steven P Sax
(74) *Attorney, Agent, or Firm*—Lee & Hayes, PLLC

(57) ABSTRACT

A system and method for facilitating non-linear viewing of media is provided. The system facilitates non-linear viewing of media by providing a scene selector that scans a digitized media and selects a scene in the digitized media and a metadata generator that produces metadata associated with the scenes and relates the metadata to the selected scene. With the scenes annotated with metadata, a playlist generator can generate a playlist of related scenes based on user inputs like queries and a playlist updater can adapt the playlist based on user reaction to the displayed scenes. The scenes can be displayed on a variety of devices exhibiting various levels of intelligence. The displays can be distributed as can the system.

29 Claims, 18 Drawing Sheets

U.S. PATENT DOCUMENTS

| | | |
|---|---|---|
| 2001/0053277 A1 | 12/2001 | Jun et al. |
| 2002/0010759 A1 | 1/2002 | Hitson et al. |
| 2002/0033842 A1* | 3/2002 | Zetts .......................... 345/719 |
| 2002/0116517 A1 | 8/2002 | Hudson et al. |
| 2002/0138630 A1 | 9/2002 | Solomon et al. |
| 2002/0186236 A1 | 12/2002 | Brown et al. |
| 2003/0117428 A1 | 6/2003 | Li et al. |
| 2004/0123725 A1 | 7/2004 | Kim |
| 2006/0048058 A1 | 3/2006 | O'Neal et al. |

OTHER PUBLICATIONS

OA Dated Feb. 17, 2009, for U.S. Appl. No. 11/009,142, 31 pages.
OA dated Jan. 17, 2010 from U.S. Appl. No. 11/009,142.

* cited by examiner

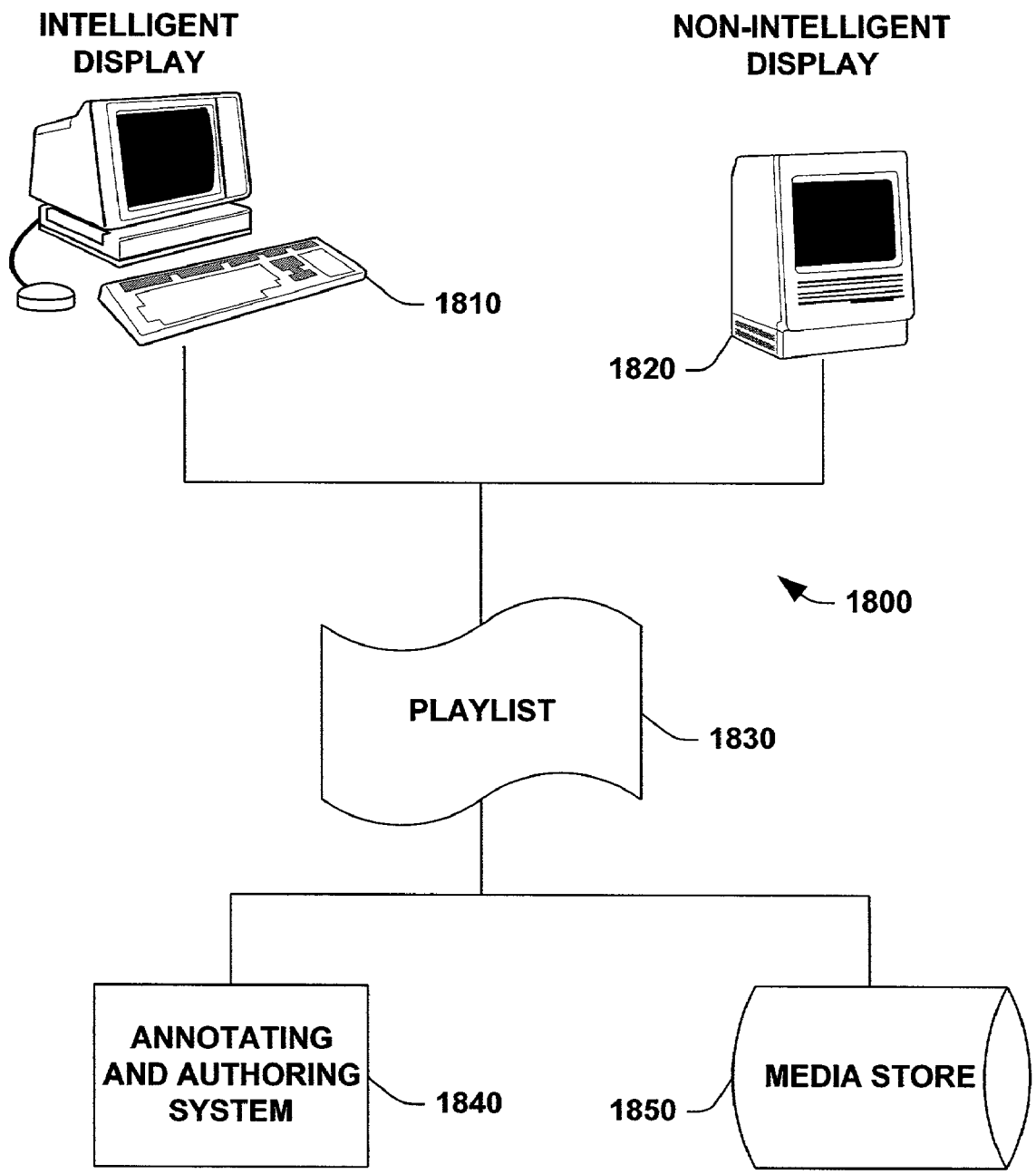

MEDIA AUTHORING AND PRESENTATION

TECHNICAL FIELD

The present invention relates generally to viewing annotated digital media and more particularly to non-linear viewing of related scenes that are annotated with metadata.

BACKGROUND OF THE INVENTION

Conventional home video viewing systems have been underutilized due to problems including, but not limited to, the difficulty of digitizing video and/or still images, complicated user interfaces and time consuming editing. For example, if a home videographer takes a two hour video, upon subsequent review there may only be ten minutes of interesting video (that are distributed between four shorter clips) that the person wants to watch or to have available to watch later. However, selecting the scenes in which the ten minutes appear, digitizing that ten minutes, editing the desired ten minutes, and arranging the shorter clips into an enjoyable, accessible presentation has conventionally been difficult. With the appearance of more and more digital cameras, both still and video, a system that facilitates simpler, faster and more widely available enjoyment of home video is desired.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a media authoring and presentation system that delivers media clip highlights (e.g., pictures, video and audio clips) to selected local and remote, active and passive connected display devices. The short media clips play randomly and each media clip is a point of entry to full length versions of those media clips stored in a media data store. The media clips serve as points of entry to facilitate non-linear viewing of additional related media from a media data store. The media is stored in a data store that facilitates accommodating multiple media types. The media is annotated with metadata that facilitates non-linear retrieval and viewing of the media. Thus, the system can continuously analyze the media to facilitate intelligent search and retrieval of related content from the data store.

Digitizing, storing and retrieving related scenes is facilitated by a user interface that simplifies selecting scenes, navigating within a media store of scenes and creating a playlist of scenes. Additionally, an application programming interface is provided that simplifies programmatic control of and access to the unannotated media and/or metadata annotated media, which facilitates automating scene selection, scene organization and scene retrieval. Information concerning the annotated scenes can be transmitted between two or more computer components in a system and thus data packets adapted to transmit such data are provided. Such data packets can be related to a data structure that stores the media and the annotating metadata associated with the media.

BRIEF DESCRIPTION OF THE DRAWINGS

FIG. 18 illustrates an additional operating environment in which the present invention may function.

DETAILED DESCRIPTION

Figure 1:
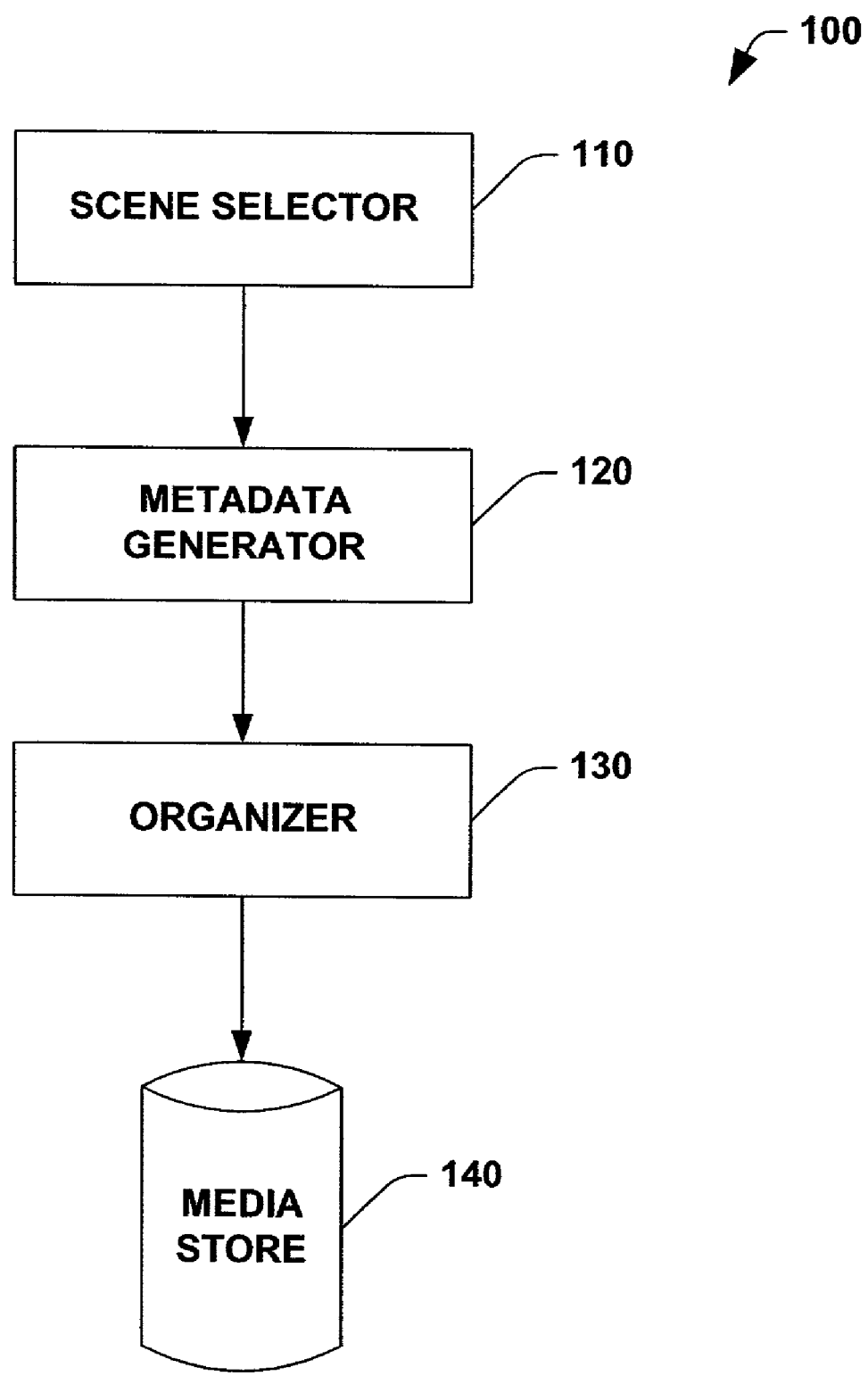
FIG. 1 is a block diagram of a system for annotating media that facilitates non-linear viewing of media, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art, that the present invention may be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

FIG. 1 is a block diagram of a system 100 for annotating media that facilitates non-linear viewing of media. The system 100 includes a scene selector 110 that scans through a digitized media and selects a scene to be annotated. Once a scene has been selected, then a metadata generator 120 produces a metadata associated with the selected scene and relates that metadata to the selected scene. For example, a data structure can be populated with one or more pieces of metadata, and a pointer to the selected scene can be stored in the data structure to establish the relationship between the selected scene and the metadata. Once the metadata has been generated, then an organizer 130 places the selected scene, the metadata and relating data (e.g., pointers, references, indices) in a media store 140 in a manner that facilitates non-linear retrieval, and thus non-linear viewing of one or more scenes stored in the media store 140.

The digitized media can be produced by a home videographer in various forms including, but not limited to, video and still images, with and/or without audio. Such digitized media can be stored, for example, on disks, memory sticks, other memories, compact disks (CDs), digital versatile disks (DVDs) and the like.

When the media includes more than one scene, (e.g., a home video with ten scenes), the scene selector 110 receives a digitized media and processes through the available scenes on the digitized media. The scene selector 110 can select a scene to annotate in various ways. By way of illustration and not limitation, the scene selector 110 may scan an input digitized media and select a scene to annotate based on recognizing a face in the scene. When face recognition is employed to select a scene, the metadata generator 120 can then annotate the scene with data associated with the recognized face. For example, a face identification number can be stored in the metadata, as can various data evaluated by the face recognizer (e.g., distance between eyes, distance between other facial reference points). By way of further illustration, the scene selector 110 can select a scene based on recognizing an item in the scene. For example, a videographer may be interested in viewing only the scenes in which a white car appears. Thus, the scene selector 110 scans the digitized media and select scenes in which a white car appears. Then, the metadata generator 120 annotates the scene with metadata concerning the white car. In both the face recognition example, and the white car recognition example, standard metadata can be generated. Such standard metadata can include, but is not limited to, the date of the scene, the time of the scene, the videographer, the length of the scene, the longer media from which the scene was retrieved, and so on. Similarly, the scene selector 110 can also select scenes based on methods including, but not limited to, voice recognition, color recognition, mood recognition and theme recognition. When a scene is selected through such methods, both method specific metadata and standard metadata are generated and associated with the scene.

The methods by which a scene can be selected can be adapted over time to respond to inputs from a user concerning whether the identified scene is one in which the user is actually interested. For example, in the white car example, while the scene selector may identify a scene in which a white SUV appears and a scene in which a white sedan appears, the user may only be interested in scenes including the white SUV. Thus, the user can provide an input to the scene selector 110 that adapts the item matching method and/or the scene selector 110 to make it more likely that scenes including a white SUV will be selected and to make it less likely that scenes including a white sedan will be selected. The effect of such adaptations can be temporary or more permanent, based, for example, on user configuration of the system 100 and/or any of its components.

The metadata produced by the metadata generator 120 can include, but is not limited to a date, a time, a length, a subject, a mood, a theme, a color, a person name, a set of person names, an item name and a set of item names associated with the scene. One or more pieces of such metadata can be generated for each scene. For example, a first scene may include both a face that is interesting to a user and a white car that is interesting to a user while a second scene may only include the white car. Thus, the metadata generator 120 can produce more metadata for the first scene than for the second scene. Therefore, the data structure employed to store the metadata associated with the scenes can vary in length based on the amount and/or type of metadata associated with a scene. It is to be appreciated that the scene selector 110, the metadata generator 120 and the organizer 130 can be computer components, as that term is defined herein.

In view of the exemplary systems shown and described herein, methodologies, which can be implemented in accordance with the present invention will be better appreciated with reference to the flow diagrams of FIGS. 2, 5, 6, 7, and 11. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies may employ additional blocks, not illustrated herein. In one example of the present invention, such methodologies can be implemented as computer executable instructions that can be stored on computer readable media including, but not limited to, disks, memories and carrier waves.

Figure 2:
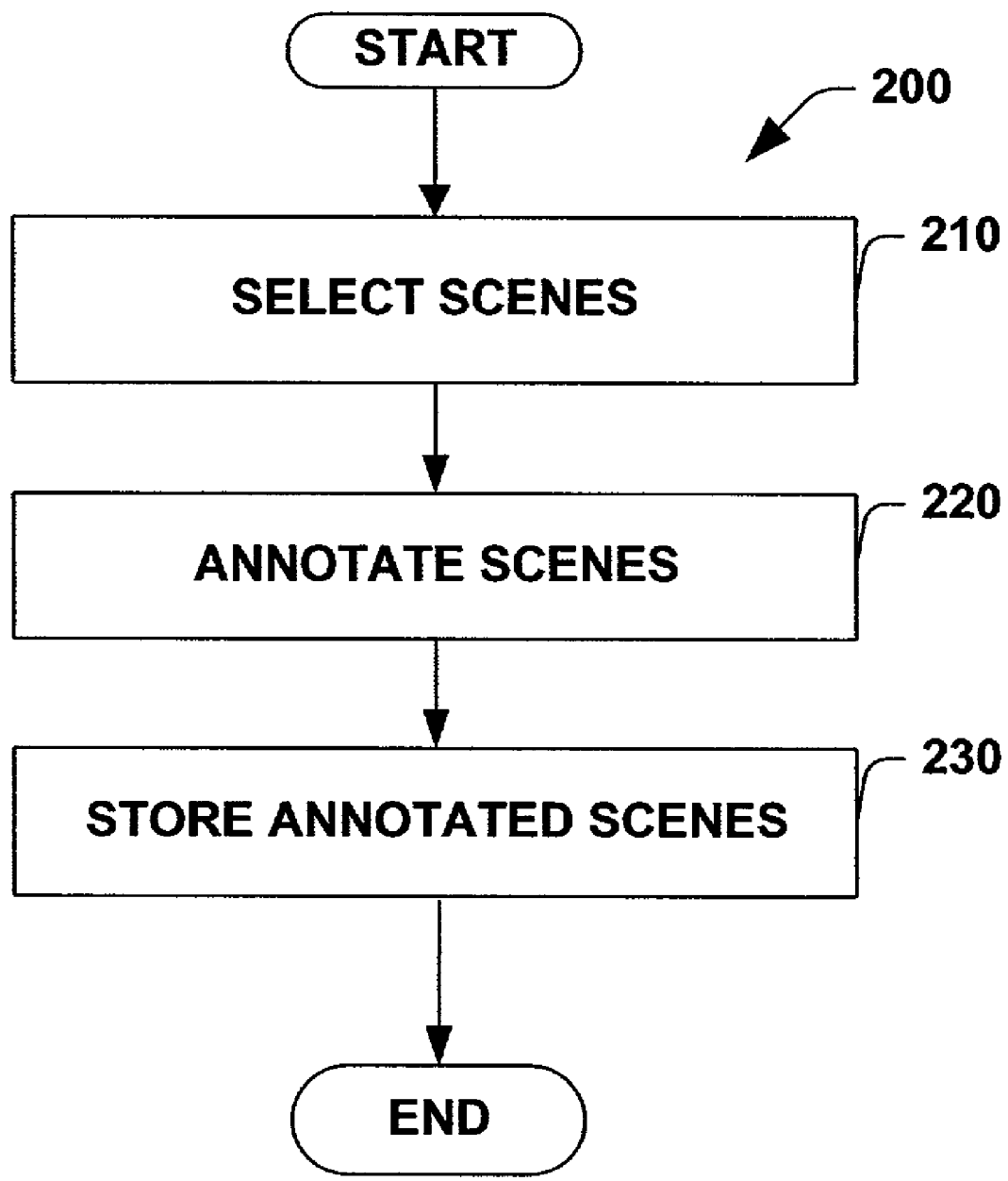
FIG. 2 is a flow chart illustrating a method for annotating media that facilitates non-linear viewing of media, in accordance with an aspect of the present invention.

FIG. 2 is a flow chart illustrating a method 200 for annotating media that facilitates non-linear viewing of media. The method 200 begins at 210 by selecting a scene from a set of digitized media scenes (e.g., a home video). The digitized media can include, but are not limited to, video images and still images. Such media can include one or more scenes, where a scene is a segment of a longer work, and where a scene may include one or more persons, items and voices and may be identified as having a mood, a theme and/or a dominant color, for example. Furthermore, a scene can also be identified with respect to the amount of action in the scene (e.g., x items move at least y distance in z period of time, x, y and z being integers), and the amount of audio excitement in the scene (e.g., m audio level changes with a maximum audio level above a threshold of n decibels, m and n being integers). Given the rich set of parameters upon which a scene may be selected, the method 200 may select scenes either manually and/or automatically. When a scene is selected manually by a user, the user may interact with a user interface that facilitates identifying the beginning and ending point for a scene and which further facilitates producing metadata associated with the scene (e.g., time, theme, faces, items). When a scene is automatically selected by the method 200, such scene selection may be performed by processes including, but not limited to, face recognition, item recognition, voice recognition, theme recognition, color recognition, motion detection and the like. Depending on the process employed to select a scene, process specific metadata can be generated (e.g., the identity of the voice that caused a scene to be selected) and the selected scene can be annotated with such process specific metadata at 220. Furthermore, regardless of the process employed to select a scene, generic metadata can be generated and the scene can be annotated with such generic metadata at 220. The generic metadata can include, but is not limited to, a scene identifier, a videographer identifier, a length of a scene, a subject matter for a scene and the like.

At 230, the annotated scene and the metadata are stored in a manner that facilitates non-linear retrieval of the annotated scene. Non-linear retrieval relates to locating scenes not in the order in which they appeared in a longer digitized media or the order in which they are stored, but in a manner, for example, where a first scene from the end of a longer first digitized media may be viewed first followed by a second scene from the start of the first digitized media followed by a third scene from the middle of a second digitized media and a fourth scene from the middle of the first digitized media. Thus, rather than starting a first home video at its beginning and watching it linearly, (e.g., from start to finish) then starting a second home video and watching it from start to finish, the present invention facilitates retrieving scenes from various locations from various digitized media. Such non-linear viewing is facilitated by the storage method employed at 230, which can include, but is not limited to, storing the selected scene and the annotating metadata in at least one of a database and a datacube, where the scene and/or the annotating metadata include references to each other.

Figure 3:
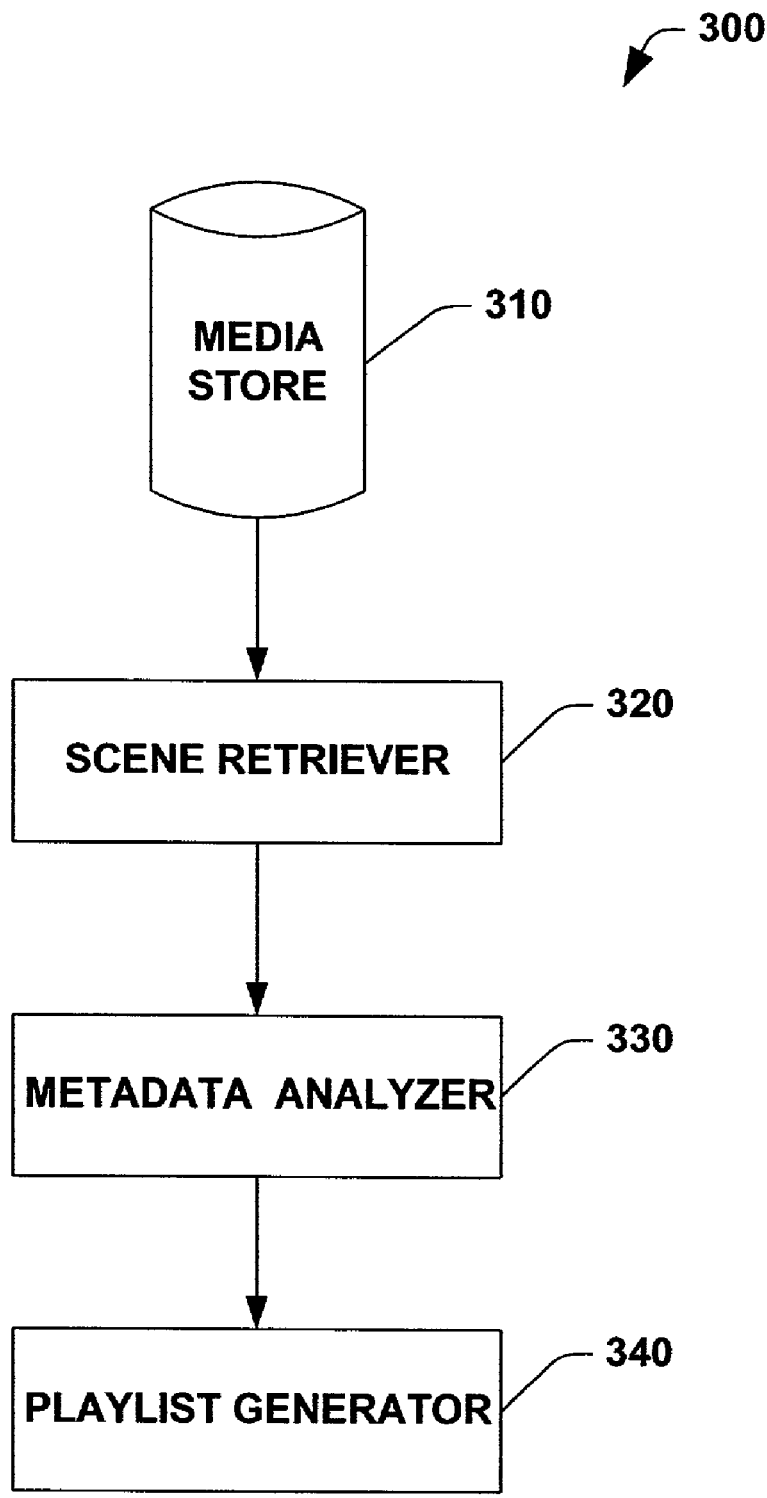
FIG. 3 is a block diagram of a system for generating a playlist of annotated media that facilitates non-linear viewing of media, in accordance with an aspect of the present invention.

FIG. 3 illustrates a system 300 for generating a playlist of annotated media that facilitates non-linear viewing of media. The system 300 includes a media store 310 in which digitized media scenes and annotating data are stored. The media store 310 can be, for example, a database, a data cube, an array, a file, a list, a tree and so on. The system 300 includes a scene retriever 320 that retrieves one or more scenes and one or more pieces of annotating metadata associated with the one or more scenes from the media store 310. By way of illustration, the scene retriever 320 can make an SQL (Structured Query Language) query to a database, where the SQL query requests scenes in which a certain voice appears. By way of further illustration, the scene retriever 320 can also examine elements and/or attributes stored in an XML file acting as the media store 310. The SQL and XML examples are provided as illustrations and are not intended to limit the methods in which the scene retriever 320 can retrieve a scene and/or annotating metadata from the media store 310.

The system 300 includes a metadata analyzer 330 that analyzes annotating metadata. The result of the analysis performed by the metadata analyzer 330 is an identification of one or more relationships involving the annotating metadata. Such relationships can occur between process specific metadata (e.g., facial recognition metadata) and between generic metadata (e.g., video date). By way of illustration, the metadata analyzer 330 may analyze metadata for substantially all scenes that include facial recognition metadata and determine which scenes share a common face. By way of further illustration, the metadata analyzer 330 can analyze metadata for substantially all scenes shot by a common videographer and determine which scenes share a common and/or related theme (e.g., outdoor scenes, action scenes). While two relationships are identified, it is to be appreciated that the metadata analyzer 330 can identify a variety of relationships.

The system 300 also includes a playlist generator 340 that evaluates the relationships identified by the metadata analyzer 330 and produces a playlist of related scenes. For example, the playlist generator 340 may produce a playlist that includes a variety of scenes that substantially all include a common face, or that substantially all include at least one face from an identified set of faces. Whether to include a scene in a playlist can be determined by analyzing, for example, a similarity value produced by the metadata analyzer 330 for a relationship that it identified. By way of illustration, voice recognition may not produce a digital (e.g., yes/no) identification of whether a voice that appears in a first scene is the same voice that appears in a second scene. The voice recognition may instead produce a confidence value concerning the likelihood that two voices belong to the same speaker. Thus, the metadata analyzer 330 can compute a similarity score between two scenes based, at least in part, on the confidence value from the voice recognition. Then, the playlist generator 340 can include scenes that score above a pre-determined, configurable threshold. In one example of the present invention, the playlist generator 340 can present options to a user concerning whether a scene should be included in a playlist. Then, based on the user accepting or rejecting the offered scene, the playlist generator 340 can be adapted via machine learning techniques to make it more or less likely that a similar scene will be offered for inclusion in the playlist. It is to be appreciated that the scene retriever 320, the metadata analyzer 330 and the playlist generator 340 can be computer components.

The system 300 can produce one or more playlists. For example, a first user may configure the scene retriever 320 to retrieve a first set of scenes from the media store 310 (e.g., scenes including fast motion) while a second user may configure the scene retriever 320 to retrieve a second set of scenes from the media store 310 (e.g., scenes in which a dog appears). Given the two different sets of scenes retrieved by the scene retriever 320, the metadata analyzer 330 can perform different analyses and identify different relationships. Thus, the playlist generator 340 can produce different playlists based on the different processing performed by the scene retriever 320 and the metadata analyzer 330.

Figure 4:
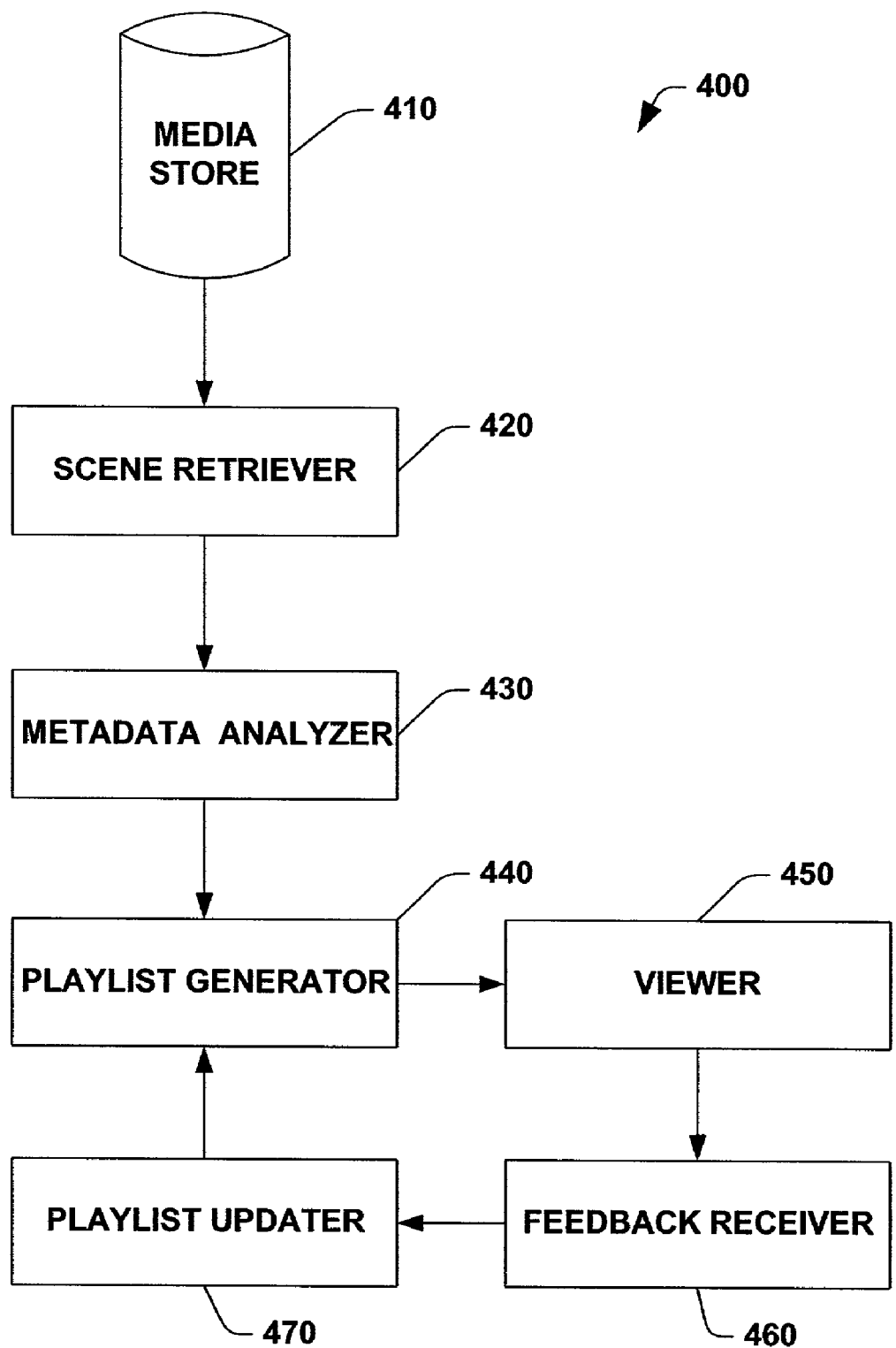
FIG. 4 is a block diagram of a system that facilitates non-linear viewing of media and receiving user feedback to selected media, in accordance with an aspect of the present invention.

FIG. 4 illustrates a system 400 that facilitates non-linear viewing of media and receiving user feedback concerning the viewed media. The system 400 includes a viewer 450 for viewing a scene identified in a playlist. The system 400 also includes a feedback receiver 460 that receives a feedback concerning the viewed scene. The viewer 450, feedback receiver 460, and playlist updater 470 can be computer components. Based on the feedback, the playlist updater 470 updates the playlist. In addition to the viewer 450, the feedback receiver 460 and the playlist updater 470, the system 400 includes a media store 410 that is substantially similar to the media store 310 (FIG. 3), a scene retriever 420 that is substantially similar to the scene retriever 320 (FIG. 3), a metadata analyzer 430 that is substantially similar to the metadata analyzer 330 (FIG. 3) and a playlist generator 440 that is substantially similar to the playlist generator 340 (FIG. 3).

The viewer 450 can be, for example, an active device that can not only identify and/or receive the scene to be displayed from the playlist, but which can also manipulate the scene (e.g., crop scene, rotate scene, slow action, speed action). The viewer 450 can also be, for example, a passive device that simply displays the scene it receives without any additional processing. Furthermore, the viewer 450 can be an intelligent device that performs processing on the received scene (e.g., color correction, digital data reconstruction, decompression, color conversions, voice translation). The viewer 450 can also be, for example, a non-intelligent device that simply displays the data it receives. While four examples of viewers 450 are described, it is to be appreciated that such examples are merely illustrative and are not intended to limit the present invention.

Given the rich variety of viewers 450, a correspondingly rich set of user feedbacks can be provided to the feedback receiver 460. By way of illustration, the feedback can include, but is not limited to, a touch input, a typed input, a mouse input, a voice input and/or a facial expression input concerning the viewed scene. For example, if the viewer 450 is a touch screen, then a user can interact with a touch screen oriented user interface to indicate feedback concerning a current scene that is being viewed. Such a feedback can include, but is not limited to, a command to skip ahead in the playlist, a command to skip back in the playlist, a command to generate a new playlist, a command to find scenes similar to the current scene and a command to play a longer scene related to the current scene. Thus, the non-linear viewing of scenes is facilitated and the ease of use of home video viewing is improved.

By way of illustration, after the operation of the scene retriever 420, the metadata analyzer 430, and the playlist generator 440, the viewer 450 may display scenes identified in a playlist. The user watching the viewer 450 may watch several related scenes and then decide that a certain scene should not be included in the list. Thus, the user may interact with the viewer 450 and/or the feedback receiver 460 and indicate that the scene should be removed from the playlist. For example, the user may click on a "remove scene" button on a graphical user interface. By way of further illustration, the user watching the viewer 450 may watch several related scenes in a playlist and may have a strong emotional (e.g., joy) reaction to three of the scenes. An intelligent, active viewer 450 and/or feedback receiver 460 may recognize the emotional reaction via, for example, facial expressions, and determine that the playlist should be updated to include similar scenes and to remove scenes that do not generate a joyous reaction. Thus, the playlist updater 470 can receive inputs from the feedback receiver 460 to add scenes to the playlist, to remove scenes from the playlist and so on. When an input to add a scene to the playlist is encountered, the playlist updater 470 can invoke processing in the playlist generator 440, the metadata analyzer 430 and the scene retriever 420, for example, to find, retrieve, analyze and include scenes in the playlist. By way of further illustration, a user watching a scene on the viewer 450 may decide that a certain scene is interesting and that the user would like to see the entire available digitized media from which the scene was retrieved. Such entire available digitized media may not be the original digitized media. For example, the original digitized media may have been edited to remove certain content, to slow down certain portions, to correct colors, to increase/decrease the volume of audio in certain portions and/or to add effects, and so on. The metadata associated with a scene included in a playlist can include references to the longer digitized media from which the scene was retrieved, which facilitates non-linear viewing of media. The metadata associated with a scene can also include references to other similar scenes (e.g., same faces, same voices, same items) and/or other longer digitized media from which such scenes were taken.

Thus, a user can watch a scene, see a face of a friend, and decide to watch other scenes in which that friend's face appears. Conventionally, such viewing would be difficult, if not impossible to perform, requiring the user to linearly watch a series of tapes from start to finish, which would include an abundance of material not related to the face of the friend in whom the user is interested. By employing the metadata annotated scenes provided by the present invention, a user can interact with a scene (e.g., frame a face and click on the face) and be presented with a new playlist of scenes that include that face. As the user watches the new playlist of scenes, the user can further interact with a scene and request a longer presentation associated with a scene. While watching the longer presentation, the user may hear a long-forgotten but familiar voice and decide to watch scenes that include that voice. The present invention facilitates retrieving such scenes and presenting a new playlist for user perusal. This sample session illustrates one example of the non-linear viewing of home video that is facilitated by the present invention.

While a playlist can be updated directly by user inputs, the present invention is not so limited. In one example, the playlist updater 470 can update the playlist based on factors including, but not limited to, a usage data, a feedback command and a time stamp. For example, if a certain scene has been viewed more than a pre-determined, configurable number of times, the playlist updater 470 can begin to "age out" the scene (e.g., progressively show the scene less frequently) so that the scene does not become stale to the user. Furthermore, the playlist updater 470 can monitor the calendar and manipulate the playlist based on the calendar and date metadata associated with a scene. By way of illustration, as Thanksgiving approaches, the playlist updater 470 can cause more scenes that were shot around previous Thanksgiving days to be included, while removing scenes that were filmed in May, June and July. By way of further illustration, as the birthday of a loved one approaches, the playlist updater 470 can cause more scenes that include the loved one to be included in the playlist, and can remove scenes that are unrelated to the loved one.

Figure 5:
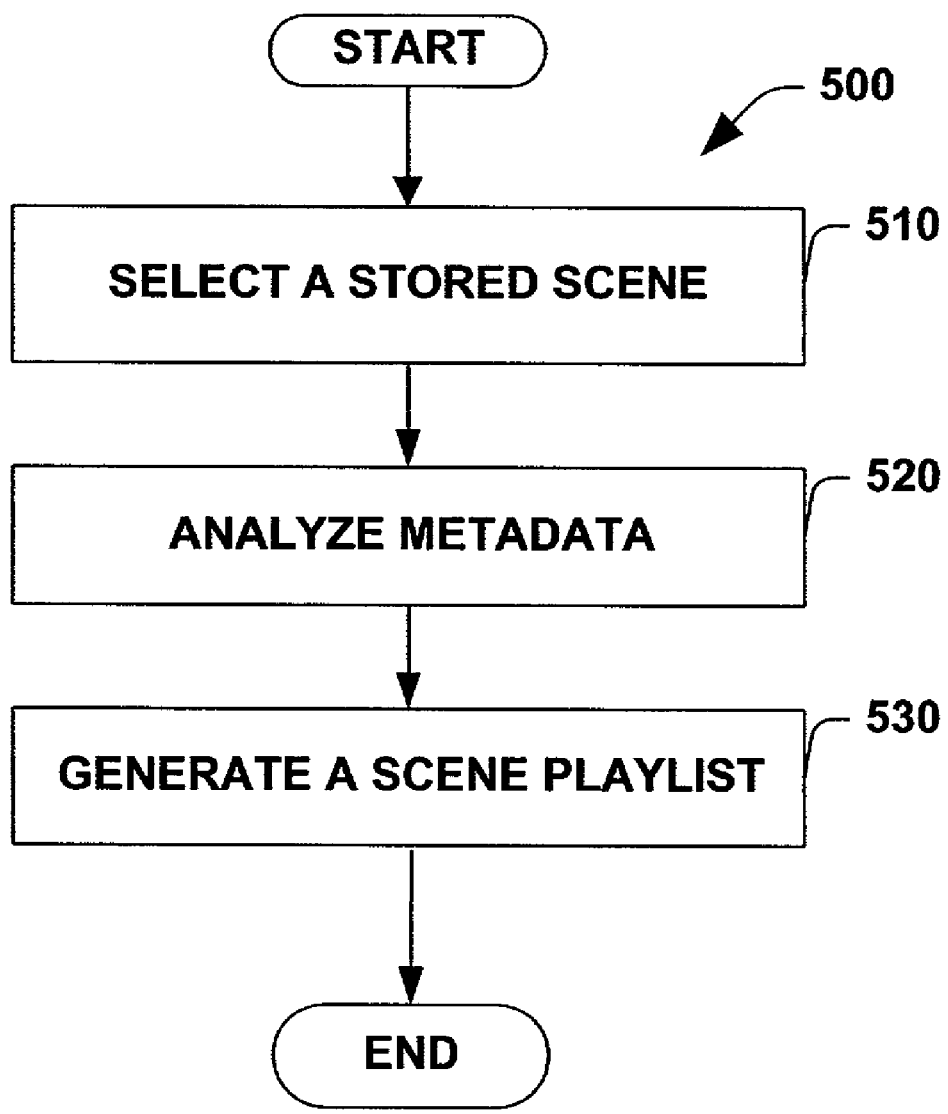
FIG. 5 is a flow chart illustrating a method for annotating media that facilitates non-linear viewing of media, in accordance with an aspect of the present invention.

FIG. 5 is a flow chart that illustrates a method 500 for annotating media to facilitate non-linear viewing of media. The method 500 includes, at 510, selecting a stored annotated scene, at 520, analyzing the annotating metadata associated with the selected scene, and at 530, generating a playlist of scenes by evaluating relationships between metadata associated with one or more scenes.

At 510, selecting a stored scene can be based, for example, on the presence of a face in the scene, on the absence of a face in the scene, on the presence of an item in the scene, on the absence of an item in the scene, on the presence of a voice in the scene, on the absence of a voice in the scene, on a mood of the scene, on the theme of the scene, and the like. While face, item, voice, theme and mood are provided as examples at 520, it is to be appreciated that other selection criteria can be employed by the present invention.

At 520, analyzing metadata associated with a scene involves computing a similarity score for metadata that hold information concerning, for example, a present face, a present item, a present voice, a mood and a theme. By way of illustration, a first scene may be annotated with first metadata items that identify a first set of faces appearing in the scene and a second scene may be annotated with second metadata items that identify a second set of faces appearing in the second scene. At 530, the number of matching faces and the confidence value for such possible matches can be computed into a scene similarity score that is then employed to determine whether to include a scene in a playlist.

At 530, a playlist is generated. In one example of the present invention, the playlist includes the scene and a reference to metadata associated with the scene. In another example of the present invention, the playlist includes references to scenes and related metadata. In yet another example of the present invention, the playlist includes both a reference to a scene and a reference to metadata associated with the scene. Thus, it is to be appreciated that the playlist is not limited to containing only one type of data.

Figure 6:
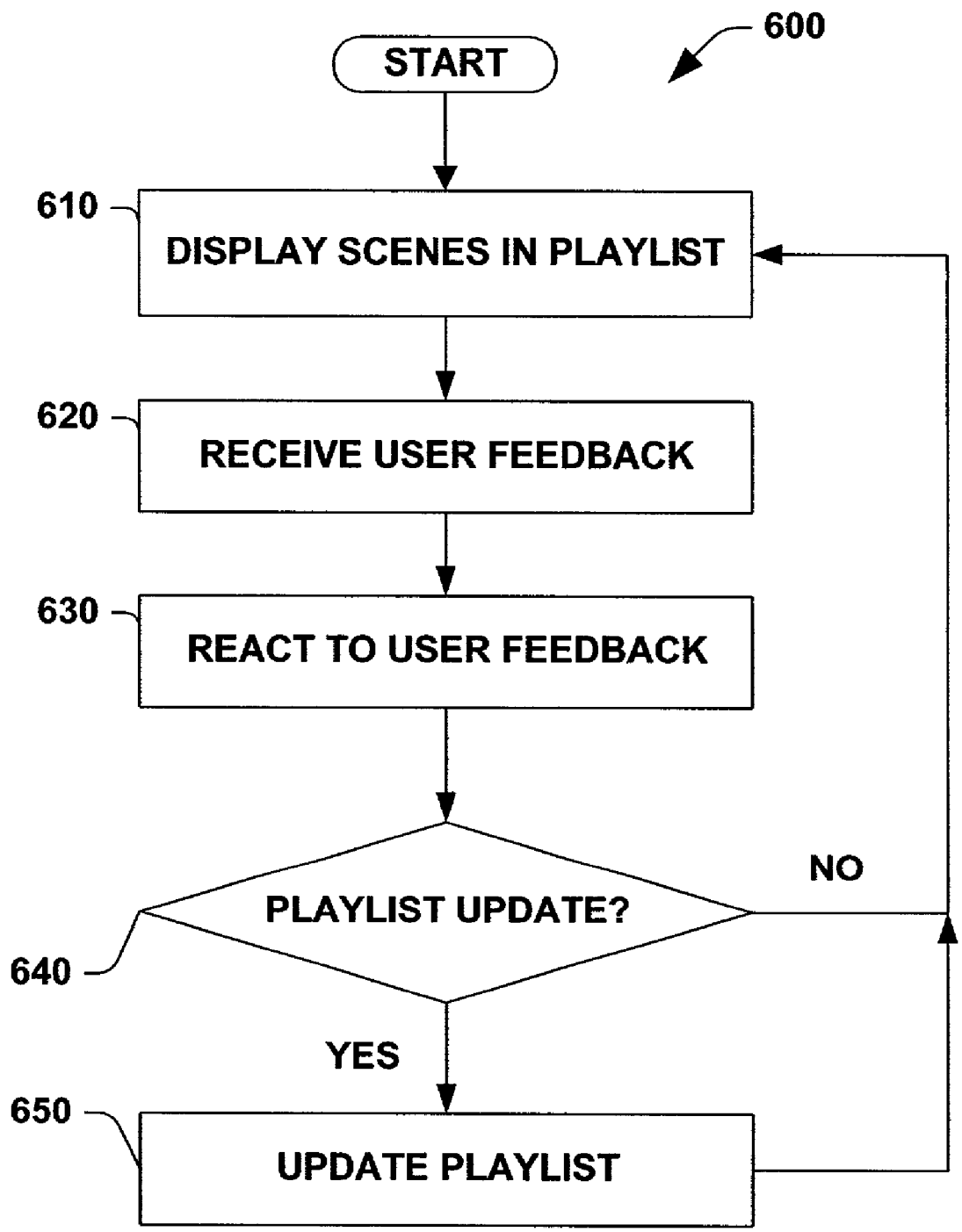
FIG. 6 is a flow chart illustrating a method for non-linear viewing of media and receiving user feedback to select media, in accordance with an aspect of the present invention.

FIG. 6 illustrates a method 600 for non-linear viewing of media and receiving user feedback to select media. At 610, a scene stored in a playlist is displayed. In one example of the present invention, a scene is a segment of a longer video, however the present invention is not so limited. For example, a scene can also be a still image or an entire short video. At 620, the method receives a user feedback related to the displayed scene. For example, the user may click on a button to indicate that the user wants to see a longer media associated with the displayed scene or the user may type a command indicating that the displayed scene should be removed from the playlist. While a mouse click and a keyboard command are described, the present invention is not so limited. The user feedback received at 620 can take forms including, but not limited to, a touch input, a typed input, a mouse input, a voice input and a facial expression input.

At 630, the method 600 can take an action based on the user feedback. For example, the method 600 can take actions including, but not limited to, moving forward in the playlist, moving backward in the playlist, searching for related media, and displaying a media item related to the scene. In some cases, the user feedback received at 620 and responded to at 630 may require the playlist to be updated. For example, if the user feedback indicates that the user would like to see more scenes that include a voice heard in a displayed scene, then this warrants an update to the playlist. Thus, at 640 a determination is made concerning whether the playlist is to be updated. If the determination at 640 is YES, then at 650 the playlist is updated based, at least in part, on the user feedback, otherwise processing returns to 610. Updating the playlist can include, by way of illustration, and not limitation, adding a scene to the playlist, removing a scene from the playlist, reordering scenes in a playlist and altering the frequency with which scenes in the playlist are displayed.

Figure 7:
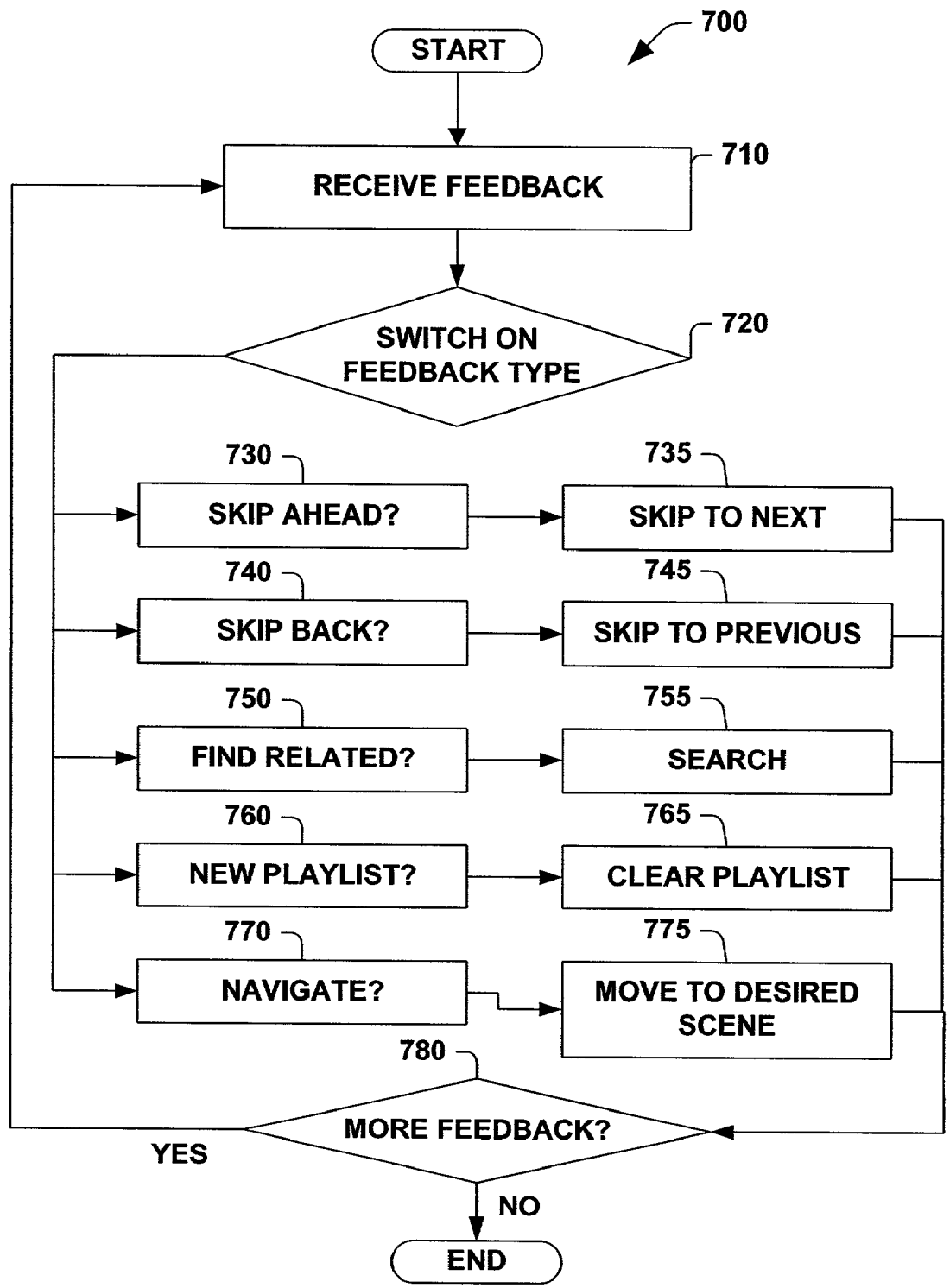
FIG. 7 is a flow chart illustrating a method for processing user feedback that facilitates non-linear viewing of media, in accordance with an aspect of the present invention.

FIG. 7 illustrates one sample method 700 for processing user feedback that facilitates non-linear viewing of media. The method 700 includes, at 710, receiving a feedback related to a viewed media scene. As noted in connection with FIG. 6, the user feedback can be received from a variety of user input devices (e.g., touch screen, keyboard, mouse, expression determiner) in a variety of forms (e.g., click, menu selection, command, monitored expression) and can convey a variety of desired actions (e.g., skip ahead, skip back, add scene, remove scene). Thus, at 720 a switch is made based on the command encoded in the user feedback. Possible switch blocks are described at 730 through 770.

At 730, a determination is made concerning whether the user feedback commands skipping ahead in the playlist. If the determination is YES, then at 735, the next scene in the playlist is presented. At 740, a determination is made concerning whether the user feedback commands skipping back in the playlist. If the determination is YES, then at 745, the previous scene in the playlist is presented. At 750, a determination is made concerning whether the feedback commands finding scenes related to the displayed scene. If the determination at 750 is YES, then at 755 a search for related scenes is undertaken. Such a search can be performed on parameters including, but not limited to, faces, items, voices, colors, moods, themes and the like. Such parameters can be retrieved, for example, from metadata associated with the viewed scene and can be searched for in metadata associated with other scenes.

At 760, a determination is made concerning whether the user feedback commands creating a new playlist. If the determination is YES, then at 765, the existing playlist is cleared and a method to create a new playlist is invoked. At 770, a determination is made concerning whether the user feedback commands navigating within a playlist. If the determination at 770 is YES, then at 775, a next desired scene is selected as the scene to display next from the playlist. At 780, a determination is made concerning whether there is any more user feedback. If the determination at 780 is YES, then processing returns to 710, otherwise processing can conclude. While FIG. 7 illustrates five possible user feedbacks, it is to be appreciated that the present invention can employ a greater and/or lesser number of such feedbacks.

Figure 8:
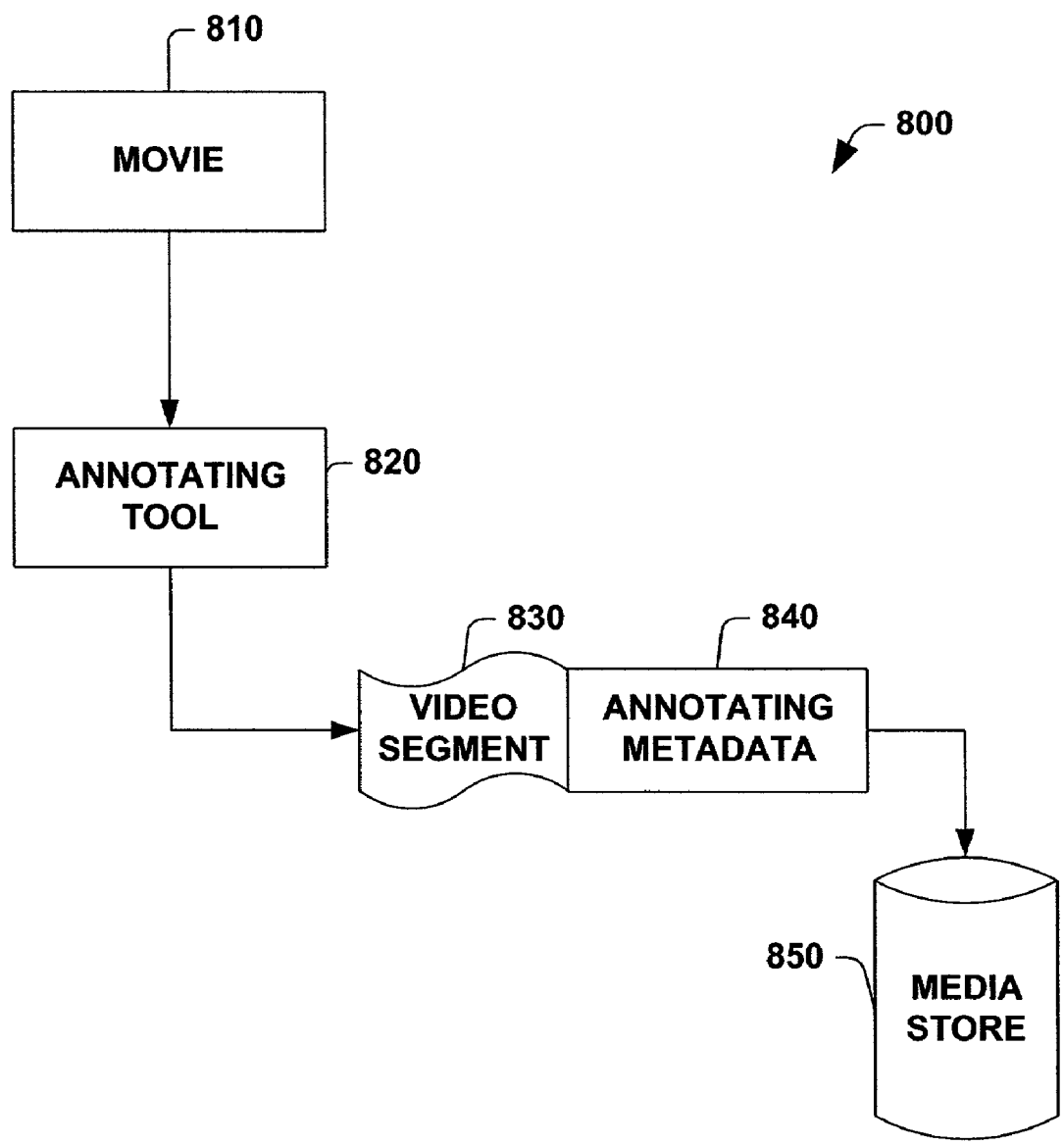
FIG. 8 is a block diagram illustrating a system for annotating media and storing such annotated media, in accordance with an aspect of the present invention.

FIG. 8 illustrates a system 800 for annotating media and storing such annotated media. The system 800 includes a media store 850 (e.g., media database) that stores a playlist, video segments, and annotating metadata associated with the video segments. A video segment 830 and an annotating metadata 840 can be related together by an annotating tool 820. The annotating tool 820 receives digitized media as input. For example, the annotating tool 820 can accept a movie 810 as input. The annotating tool 820 can then produce the annotating metadata 840 and associate it with a video segment 830 parsed out of the movie 810.

In one example of the system 800, the annotating metadata 840 can include, but is not limited to, a date identifier that identifies the date when the video was taken, a time identifier that identifies a time when the video was taken, a videographer identifier that identifies who took the video, a face identifier that identifies one or more faces in the video, an item identifier that identifies one or more items in the video, a voice identifier that identifies one or more voices in the video, a mood identifier that identifies one or more moods associated with the video, and a theme identifier that identifies one or more themes associated with the video.

In one example of the present invention, the annotating metadata 840 is generated manually by a user. For example, the user can create the annotating metadata topic (e.g., mood, theme) and then assign a value for the metadata topic (e.g., happy, Veteran's day). In another example of the present invention, the annotating metadata 840 is generated automatically by a computer component. Such a computer component generates the annotating metadata 840 based, at least in part, on face recognition processing, item recognition processing, voice recognition processing, mood recognition processing and theme recognition processing.

In yet another example of the system, the annotating tool 820 is adapted by a machine learning technique based, at least in part, on a user input concerning the annotating metadata 840 generated by the annotating tool 820. For example, the annotating tool 820 can generate a value for a metadata topic (e.g., happy for mood), yet the user may determine that the mood is actually "ecstatic". Thus, the user can reconfigure one or more configurable parameters associated with the annotating tool 820 to make it more likely that the annotating tool 820 would identify the scene and similar scenes as "ecstatic" rather than "happy". Such configurable parameters may be threshold values for a neural network, a count of scene emotion identifiers (e.g., number of smiles per minute, number of different smiling people), and the like. It is to be appreciated that the annotating tool 820 can be a computer component.

Figure 9:
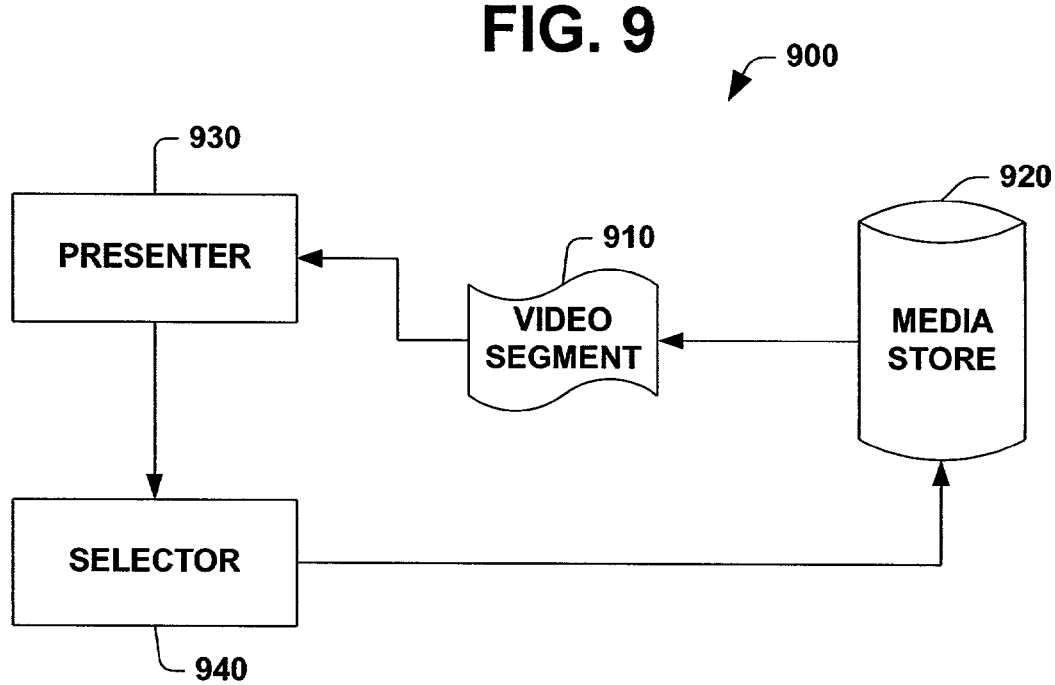
FIG. 9 is a block diagram illustrating a system for viewing annotated media and receiving feedback concerning such annotated media, in accordance with an aspect of the present invention.

FIG. 9 illustrates a system 900 for viewing annotated media and receiving feedback concerning such annotated media. The system 900 includes a media store 920 that stores metadata annotated, displayable items. For example, the media store 920 can store one or more video segments 910 that have metadata associated with them. The media store 920 can be, for example, a database, a data cube, a list, an array, a tree and a file, among other things. In one example of the present invention, the media store 920 is a database that can be accessed by SQL. In another example of the present invention, the media store 920 stores XML files.

The system 900 also includes a presenter 930 that presents displayable items retrieved from the media store 920. The presenter 930 can be an active and/or passive display that does or does not have local intelligence. In one example of the present invention, the presenter 930 presents a first displayable item from the media store 920 and then the system 900 accepts feedback concerning which displayable item should be displayed next. The feedback can be, for example, a spoken word, a keystroke, a mouse click, and a facial expression. Such feedback facilitates viewing scenes in an order desired by the user rather than linearly from start to finish in a predetermined order, providing advantages over conventional systems.

To facilitate such non-linear viewing, the system 900 also includes a selector 940 that selects a second displayable item from the media store 920 based, at least in part, on a relationship between a metadata associated with the first displayed item and a metadata associated with the second displayable item. Thus, the order in which video segments are viewed can depend on user reaction to displayed video segments. It is to be appreciated that the presenter 930 and the selector 940 can be computer components.

Figure 10:
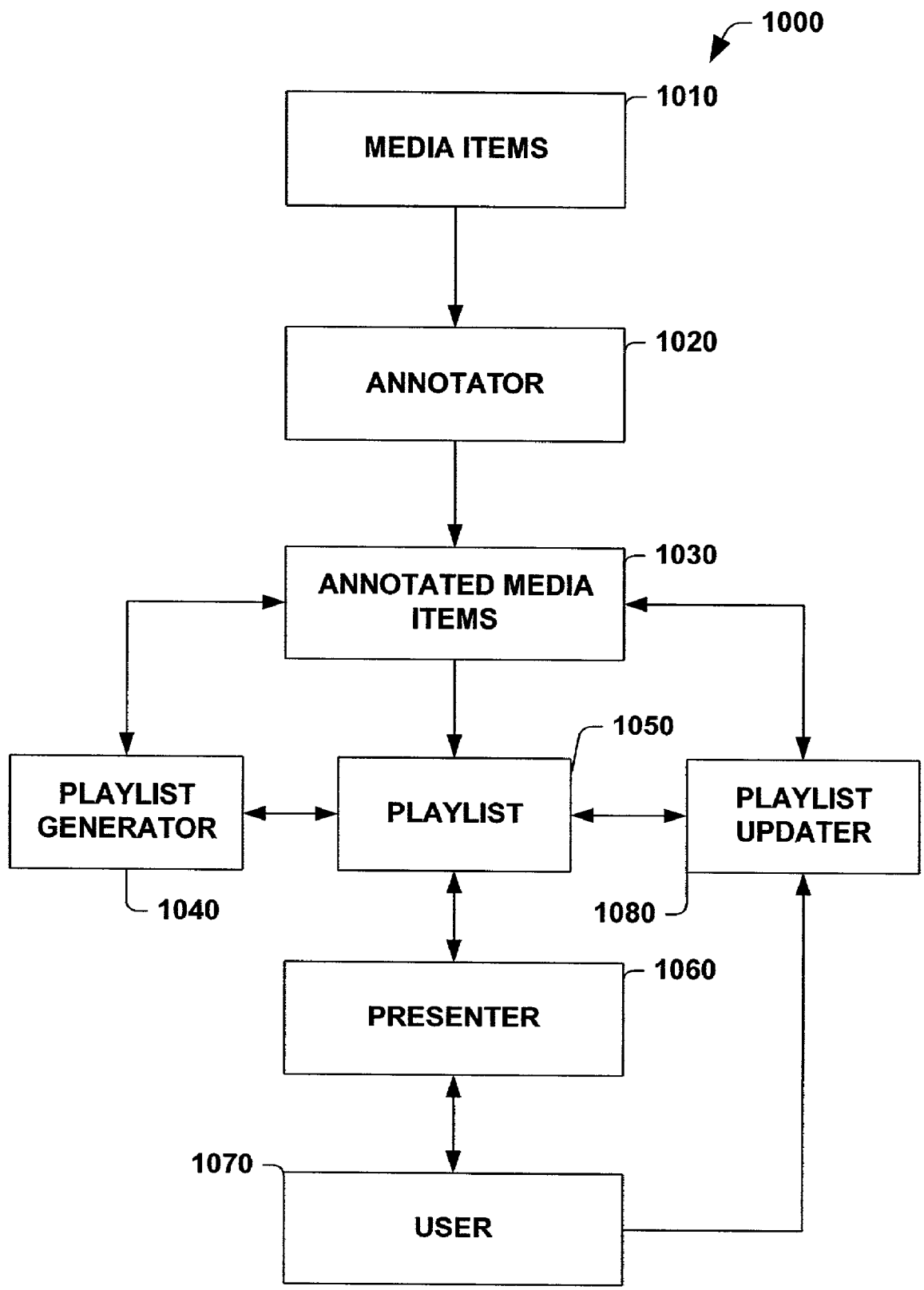
FIG. 10 is a block diagram illustrating a system for authoring and presenting media, in accordance with an aspect of the present invention.

FIG. 10 illustrates a system 1000 for authoring and presenting media. The system 1000 includes an annotator 1020 that receives a set of media items 1010 and annotates the media items 1010 with metadata. Such metadata annotated media items 1030 facilitate retrieving media items related by the metadata. For example, if a user desires to watch scenes that include two or more faces that match the faces in a selected scene, then the metadata can be examined to determine matches between the metadata and to facilitate retrieving such related scenes.

The system 1000 also includes a playlist generator 1040 that generates a playlist 1050 of annotated media items 1030. Such annotated media items 1030 may be related, for example, by a first metadata retrieved in response to a first query. By way of illustration, a user may have generated an SQL query to an SQL database to retrieve scenes in which a favorite dog appears. Thus, the playlist 1050 can contain media items related by the metadata associated with scenes that include metadata indicating the presence of the favorite dog.

The system 1000 also includes a presenter 1060 for presenting annotated media items 1030 identified in the playlist 1050. The presenter 1060 can be, for example, an intelligent device (e.g., personal computer) or a dumb device (e.g., standard television). While a user watches media items identified in the playlist 1050, the user may decide to watch different videos and/or to update the playlist 1050. In deciding to watch different videos, and/or to watch complete versions of displayed scenes, the user may generate a second query that retrieves a second set of metadata responsive to the second query. Thus, the system 1000 includes a playlist updater 1080 that updates the playlist 1050 based, for example, on the second metadata retrieved in response to a second query. Since the second metadata was responsive to a query, and the query was generated as a response to viewing a first scene that had related first metadata, the second metadata can be related to the first metadata, which facilitates faster retrieval of related scenes by limiting the amount of metadata that is searched. In one example of the present invention, the annotator 1020, playlist generator 1040, playlist updater 1080 and presenter 1060 are computer components.

Figure 11:
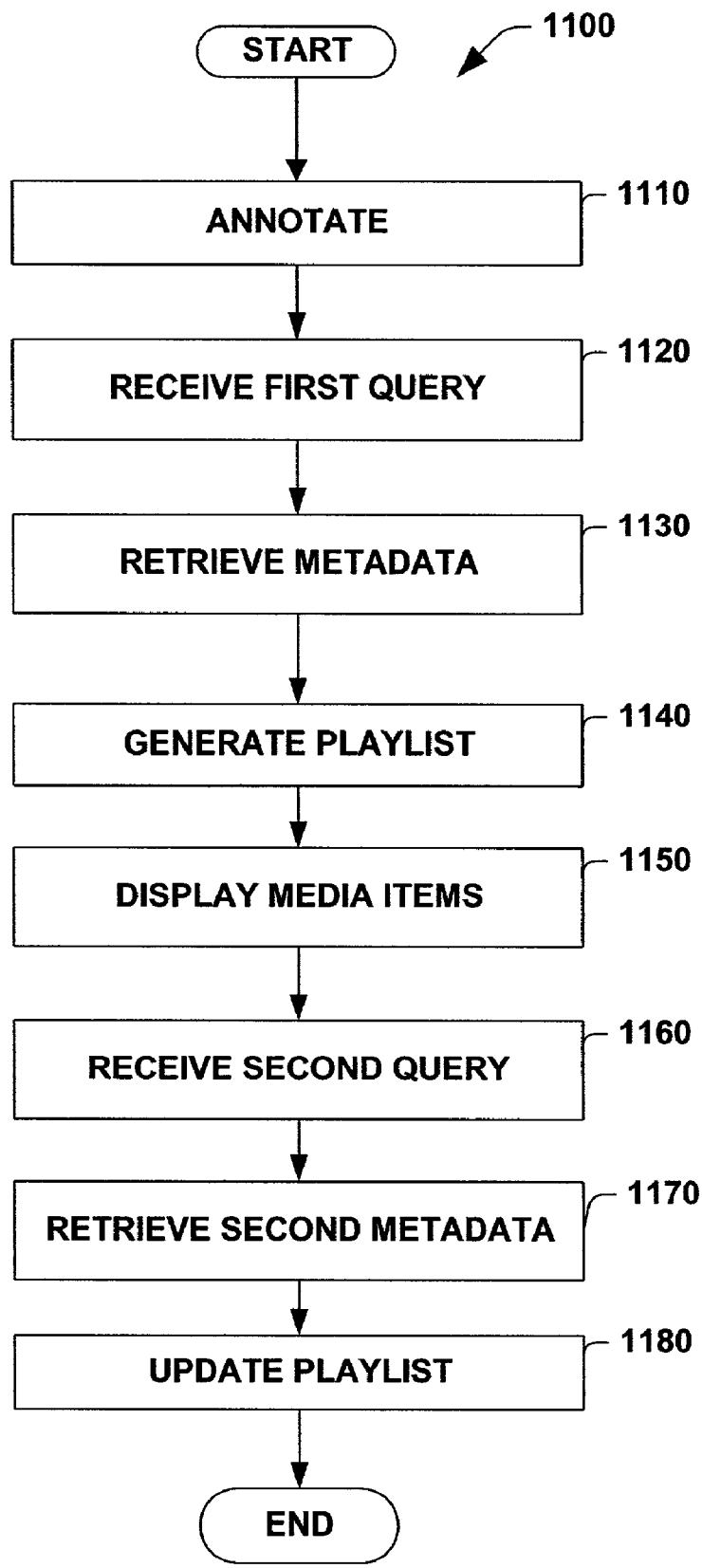
FIG. 11 is a flow chart illustrating a method for authoring and presenting media, in accordance with an aspect of the present invention.

FIG. 11 illustrates a method 1100 for authoring and presenting media. The method 1100 begins at 1110 where the method 1100 annotates a set of media items with metadata to facilitate metadata based retrieval of one or more of the set of media items. For example, scenes that include a certain voice can be annotated with metadata that indicates that there is an identified voice available and the identity of that voice. At 1120, the method 1100 receives a first query. The first query is employed to identify one or more media items based on a relationship between a media item and a metadata item and/or value. For example, the first query may request scenes in which a certain voice is present. Thus, at 1130, the method 1100 can retrieve a first metadata responsive to the first query. For example, pointers to metadata blocks that include the desired voice can be retrieved.

At 1140, the method 1100 generates a playlist of media items related by one or more metadata items in the first metadata. For example, while a first number of scenes may include an identified voice, at 1140, the method 1100 may select the scenes where the identified voice appears at least ten percent of the time. Thus, the playlist will contain voice identification related metadata items. After the playlist has been generated, at 1150, media items listed in the playlist will be displayed. A user watching the media items in the playlist can generate a feedback concerning which media item they wish to view next. Thus, at 1160, the method 1100 receives a second query related to identifying a media item by a relationship between the media item and a metadata. For example, while viewing a scene in which the desired voice appears, the user may see an item (e.g., a snowman) that prompts the user to desire to view different videos (e.g., snow covered, holiday theme videos in which the desired voice appears). Thus, the user can generate a second query to retrieve such videos. The query can cause an examination of metadata associated with video scenes and retrieval, at 1170, of a second metadata responsive to the second query. When the second metadata responsive to the second query has been retrieved, then at 1180, the playlist can be updated based, at least in part, on that second metadata. While a linear flow is depicted in FIG. 11, it is to be appreciated that the method 1100 may loop.

Figure 12:
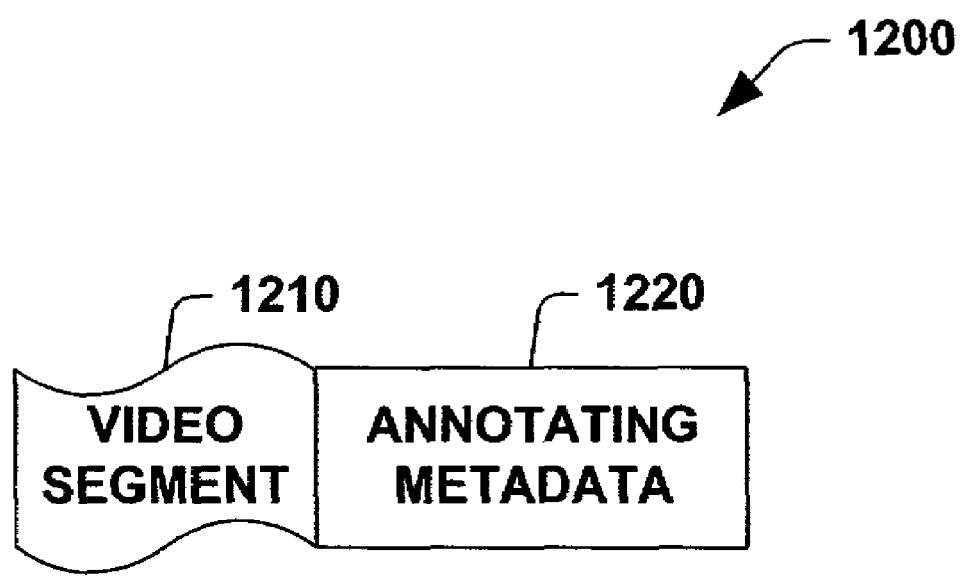
FIG. 12 illustrates a data structure employed in accordance with an aspect of the present invention.

FIG. 12 illustrates a data structure 1200 employed in a system that facilitates non-linear viewing of media items. The data structure 1200 has a first field that holds a media item, for example, a video segment 1210. While a video segment 1210 is illustrated, it is to be appreciated that the media item may be a full length video, a video scene, a still image, a combination of scenes and/or images, and the like. Additionally and/or alternatively, the first field can hold a reference to a memory location or locations where such videos, scenes, images and the like are stored. The data structure 1200 also includes a second field that holds a metadata item related to the media item, for example an annotating metadata 1220. This metadata facilitates activities including, but not limited to, identifying the media item, locating the media item and locating a related media item.

The data structure 1200 is merely exemplary and it is to be appreciated that numerous other structures are contemplated that provide for organizing and/or storing a plurality of data types conducive to facilitating the non-linear viewing of related media scenes in connection with the subject invention. Any such data structure suitable for employment in connection with the present invention is intended to fall within the scope of the appended claims. Such data structures can be stored in computer readable media including, but not limited to, memories, disks and carrier waves.

Figure 13:
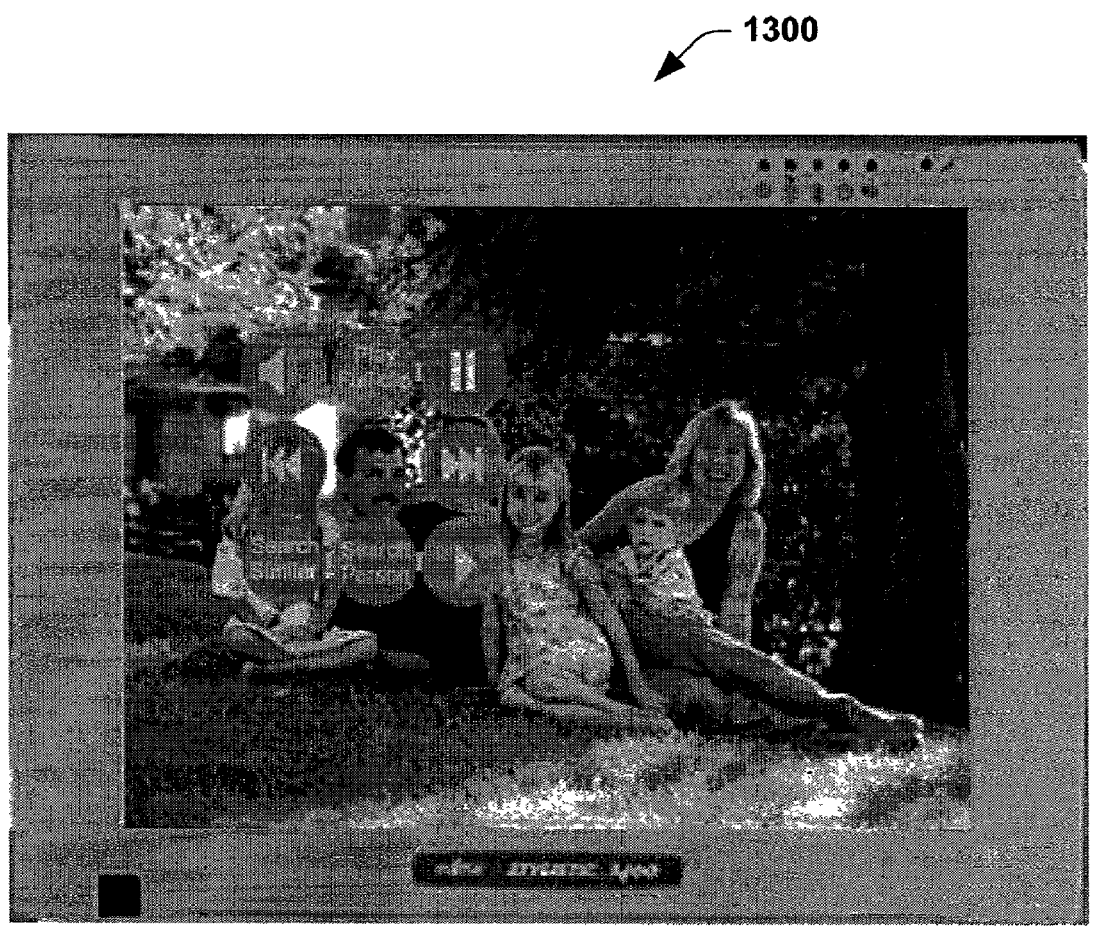
FIG. 13 is a sample screen shot illustrating a user interface employed in accordance with an aspect of the present invention.

FIG. 13 is a sample screen shot illustrating a user interface 1300 that facilitates non-linear viewing of related media scenes. The user interface 1300 depicts a scene wherein a number of family members are viewed. In the example user interface 1300, the image is displayed on a touch screen. In the depicted simulated screen shot, a user has touched the user interface 1300 on the face of the father. The user interface 1300 has, therefore, framed the face with buttons that facilitate adapting the scene and/or a playlist in which the scene appears. By way of illustration, in the sample user interface 1300, a button that symbolizes a speaker is presented in the top left hand corner of the frame around the father's face. Such a button can be employed, for example, to turn on or off the audio associated with a scene. By way of further illustration, a right facing equilateral triangle is presented in the lower right hand corner of the frame around the father's face. Such a button can be employed, for example, to skip ahead to the next scene in a playlist. While the user interface 1300 is depicted on a touch screen, it is to be appreciated that the depicted buttons could be "pressed" by methods including, but not limited to, touching, keyboard command, voice input, mouse input, and the like. Furthermore, while eight buttons are depicted in user interface 1300, it is to be appreciated that a greater and/or lesser number of buttons and/or other graphical user interface elements can be employed in accordance with the present invention.

Thus, in one example of the present invention, a computer system that facilitates non-linear viewing of media includes a graphical user interface that has a display and a selection device. The display may be, for example, an active or passive, intelligent or non-intelligent device. The graphical user interface supports a method of providing and selecting from a set of graphic user interface elements on the display. The graphical user interface elements can include, but are not limited to, buttons, menus, sliders, drop down boxes, frames, halos, radio buttons, check boxes, and the like. The graphical user interface can retrieve a set of graphic user interface elements where the interface elements represent one or more actions action associated with facilitating the non-linear display of media items. For example, an element can be associated with skipping ahead or skipping back in a playlist. The graphical user interface displays the set of interface elements on the display and receives an interface element selection signal that indicates which of the set of interface elements has been chosen by a user. In response to the interface element selection signal, the graphical user interface initiates processing to facilitate non-linear viewing of media.

Figure 14:
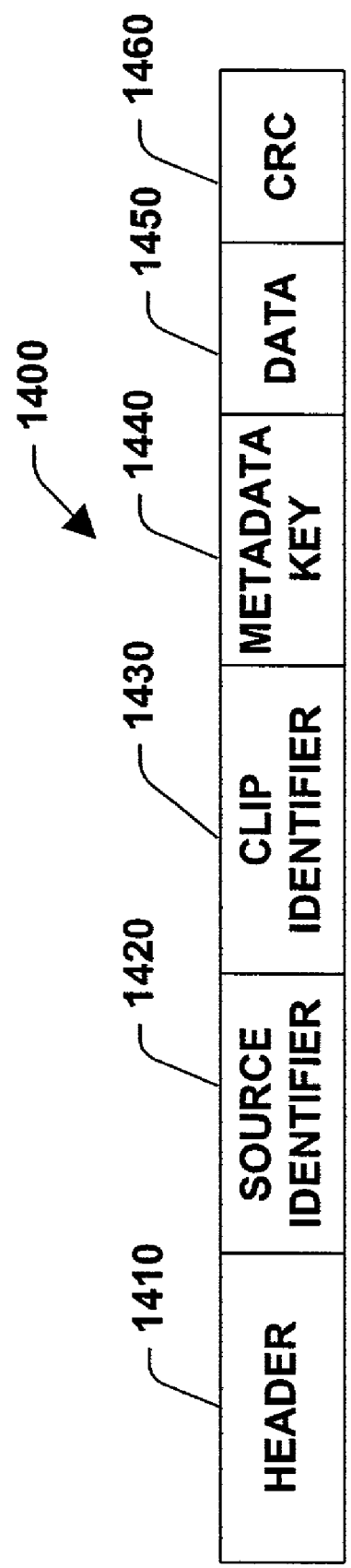
FIG. 14 illustrates a sample data packet employed in accordance with an aspect of the present invention.

FIG. 14 illustrates a sample data packet 1400 employed to transfer information between various computer components associated with the present invention. The data packet 1400 includes a header field 1410 that includes information such as the length and type of packet. For example, the header field 1410 may indicate whether the packet 1400 is a packet type that requires a response from the receiving device. A source identifier 1420 holds data concerning the location from which the data packet originated (e.g., media store, annotating tool). The data packet 1400 also includes a clip identifier 1430 that facilitates identifying a clip. The identifier can be, for example, a 128 bit integer that uniquely identifies a clip, or, in another example, can be a text string (e.g., file pathname).

The data packet 1400 also includes a metadata key 1440 that facilitates retrieving metadata associated with the clip identified in the clip identifier field 1430. For example, while the clip identifier 1430 may be a primary key accessible in an SQL database, the metadata key 1440 may be a secondary key similarly accessible in the SQL database or a separate primary key in a second database. The data packet 1400 includes a data field 1450 in the packet 1400 that includes various information that is intended to be communicated to the receiving computer component. The data packet 1400 ends with a cyclical redundancy check (CRC) field 1460 that serves as an error detecting field whereby a receiving device can determine if it has properly received a packet 1400. While six fields are illustrated in data packet 1400, it is to be appreciated that a greater and/or lesser number of fields can be employed in packets utilized by the present invention.

Another example data packet may be transmitted between a computer component implementing an annotating tool and a media store. Such a data packet (not illustrated) may include, for example, a first field that stores a clip identifier that identifies a portion of a media. The identifier may be, for example, a globally unique identifier that facilitates locating the clip regardless of storage location. The example data packet can also include a second field that stores a metadata key that identifies an annotating metadata associated with the clip identified by the clip identifier. Again, such metadata key may be a globally unique identifier that facilitates retrieving the metadata from various distributed media stores. The data packet can also include a third field that stores data associated with the clip identified by the clip identifier. Such data may be, for example, the clip, or a longer work from which the clip was derived.

Yet another data packet adapted to be transmitted between a user interface and a playlist updater to facilitate the non-linear viewing of a media can include a first field that stores a clip identifier that identifies a portion of a media, the clip identifier is substantially similar to the clip identifier described in the other data packets. The data packet can also include a second field that stores a requested user action concerning the portion identified by the clip identifier. For example, the second field can store commands to add a scene to a playlist, remove a scene from a playlist and to search for related scenes. The data packet can also include a third field that stores metadata associated with the portion identified by the clip identifier. Such metadata can be employed to retrieve one or more clips according to the requested user action.

Figure 15:
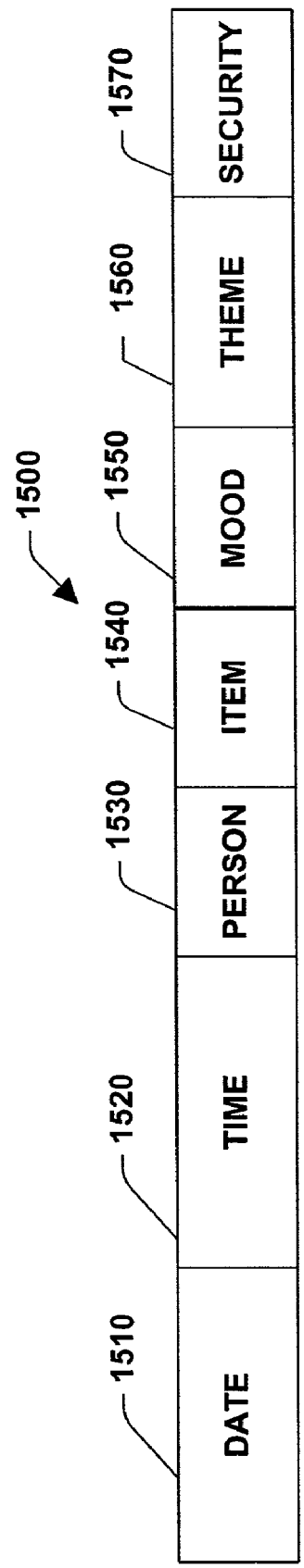
FIG. 15 illustrates another sample data packet employed in accordance with an aspect of the present invention.

FIG. 15 is a schematic illustration of sub-fields 1500 within the data field 1450 (FIG. 14). The sub-fields 1500 discussed are merely exemplary and it is to be appreciated that a greater or lesser number of fields could be employed with various types of data germane to facilitating non-linear viewing of media in accordance with the present invention.

The sub-fields 1500 include a date field 1510 that can hold information concerning the date when a media item was filmed. A time field 1520 can hold information relating to the time when the media item was filmed, and/or, for example, the length, in periods of time, of a media item. A person field 1530 can hold information concerning people who are recognized in the scene. Such recognition may have occurred, by, for example, voice recognition and/or face recognition. Similarly, an item field 1540 can hold information concerning items that are recognized in the scene. Other fields include, but are not limited to, a mood field 1550, a theme field 1560, and a security field 1570. The security field 1570 can hold, for example, identifiers associated with users who are permitted to view the media related to the data packet 1500.

Figure 16:
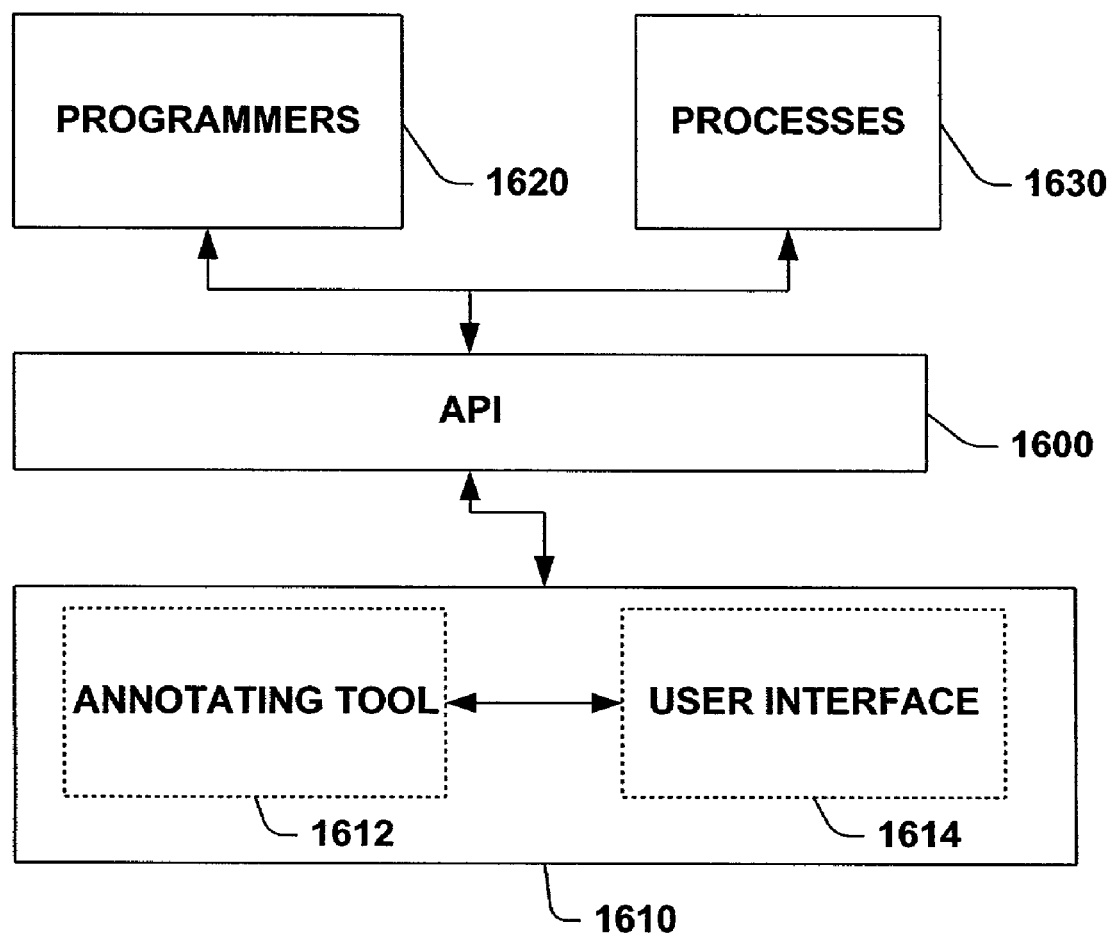
FIG. 16 illustrates an application programming interface employed in accordance with an aspect of the present invention.

Referring now to FIG. 16, an application programming interface (API) 1600 is illustrated providing access to a system 1610 that includes an annotating tool 1612 and a user interface 1614. The API 1600 may be employed, for example, by programmers 1620 and/or processes 1630 to gain access to processing performed by the system 1610. Similarly, the API 1600 may be employed to provide data values to the system 1610 and/or retrieve data values from the system 1610. Thus, in one example of the present invention, a set of application program interfaces can be embodied on a computer-readable medium. The interfaces can be executed by a computer component to gain access to an annotating tool that is employed to annotate media in a manner that facilitates non-linear retrieval of the media. Such interfaces can include, but are not limited to, a first interface that receives media information, a second interface that receives annotation information associated with the media, and a third interface that receives user interface information associated with the order in which media will be displayed.

Figure 17:
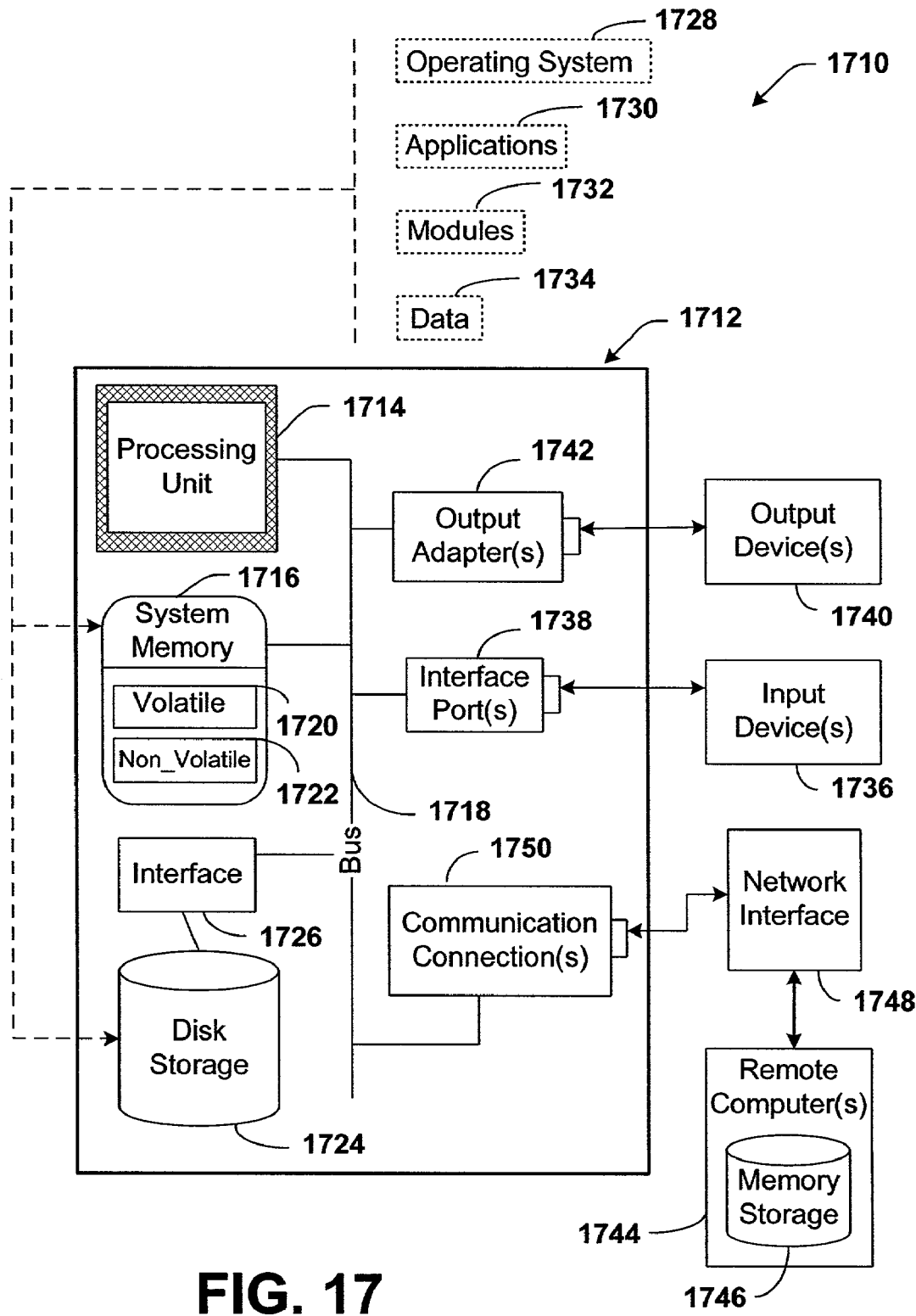
FIG. 17 illustrates an example operating environment in which the present invention may function.

In order to provide additional context for various aspects of the present invention, FIG. 17 and the following discussion are intended to provide a brief, general description of a suitable operating environment 1710 in which various aspects of the present invention may be implemented. FIG. 18 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 17, an exemplary environment 1710 for implementing various aspects of the invention includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multi-processor architectures also can be employed as the processing unit 1714.

The system bus 1718 can be any of several types of bus structure including the memory bus or memory controller, a peripheral bus or external bus, and/or a local bus using any variety of available bus architectures including but not limited to 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jazz drive, Zip drive, LS-100 drive, flash memory card, or memory stick. In addition, disk storage 1724 can include storage media separately or in combination with other storage media including but not limited to an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 1716 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer 1744. The remote computer 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer 1744. Remote computer 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 illustrates an additional operating environment 1800 in which the present invention may function. The environment 1800 is a distributed environment wherein various computer components and/or data stores of the present invention are distributed between various locations. For example, the system 1800 includes an intelligent display 1810 that can be located at a first location and a non-intelligent display 1820 that can be located at a second location. While a single intelligent display 1810 and a single non-intelligent display 1820 are displayed, it is to be appreciated that a greater number of such displays can be employed with the present invention and that such displays can be located at distributed locations.

The displays 1810 and 1820 display media items identified in a playlist 1830. The playlist 1830 is generated by an annotating and authoring system 1840 and refers to media items that are stored in a media store 1850. While a single annotating and authoring system 1840 is illustrated, it is to be appreciated that cooperating computer components can be employed to implement the annotating and authoring system 1840. Thus, the computer components can be distributed between various processors, processes, threads, and locations. Similarly, while a single media store 1850 is illustrated, it is to be appreciated that a distributed data storage can be employed with the present invention. Thus, in one example of the present invention, media items identified in the playlist 1830 can be stored at different locations, in different formats and retrieved by different methods.

What has been described above includes examples of the present invention. It is of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system that monitors reaction to a media scene, comprising:
    a scene retriever that retrieves a scene from a media store and retrieves from the media store annotating metadata associated with the scene;
    a metadata analyzer that analyzes the annotating metadata of the retrieved scene together with annotating metadata of at least one other scene in the media store in order to identify a relationship;
    a playlist generator that evaluates the relationship and produces a playlist of related scenes retrieved from the media store based on the relationship;
    a viewer that displays the playlist of related scenes;
    a feedback receiver that monitors passive feedback in response to the playlist displayed by the viewer, the passive feedback comprises at least a user's emotional reaction as inferred by monitoring the user's facial expression using an image capture device and recognizing the user's emotional reaction via the monitored facial expressions; and
    a playlist updater that updates the playlist based at least in part on the passive feedback.

2. The system of claim 1, the viewer is an active or intelligent device that performs a manipulation of at least one scene in the playlist prior to display.

3. The system of claim 2, the manipulation is at least one of cropping the scene, rotating the scene, increasing the play speed, decreasing the play speed, color correction, digital data reconstruction, decompression, color conversions, or voice translation.

4. The system of claim 1, the feedback receiver further receives active feedback associated with the playlist displayed by the viewer, the active feedback is at least one of a touch input, a typed input, a mouse input, or a voice input.

5. The system of claim 4, the active feedback comprises at least one of a command to skip ahead in the playlist, a command to skip back in the playlist, a command to generate a new playlist, a command to find scenes similar to the current scene, or a command to play a longer scene related to the current scene.

6. The system of claim 1, the scene retriever retrieves the scene based at least in part on a value stored in the associated annotating metadata.

7. The system of claim 4, wherein the playlist updater updates the playlist based additionally on the active feedback.

8. The system of claim 1, the playlist generator populates the playlist with related scenes based at least in part on a value stored in the annotating metadata for each respective scene.

9. The system of claim 1, the playlist updater updates the playlist based on at least one of a usage data, a feedback command, or a time stamp.

10. The system of claim 1, the metadata analyzer computes a similarity value for the relationship between respective scenes.

11. The system of claim 10, the playlist generator produces the playlist of related scenes based at least in part on the similarity value.

12. The system of claim 1, further comprising at least one of the following:
   a scene selector that scans a digitized media and selects a scene in the digitized media;
   a metadata generator that produces metadata associated with the selected scene and relates the metadata to the selected scene; or
   an organizer that places the selected scene and the metadata in a media store to facilitate non-linear viewing of one or more scenes.

13. The system of claim 12, the scene selector selects a scene based on at least one of face recognition, item recognition, voice recognition, color recognition, mood recognition, or theme recognition.

14. The system of claim 12, the scene selector selects a scene based at least in part on the passive feedback or based on an input from a user.

15. The system of claim 13, the at least one of the face recognition, item recognition, voice recognition, color recognition, mood recognition and theme recognition is adapted by a machine learning technique based at least in part on the input from the user.

16. The system of claim 12, the metadata generator produces and stores to the metadata at least one of a date, a time, a length, a subject, a mood, a theme, a color, a person name, a set of person names, an item name, or a set of item names associated with the scene.

17. A method for obtaining reactions associated with viewing of media, comprising:
   accessing a scene stored in a media store;
   accessing metadata associated with the scene from the media store;
   analyzing the metadata associated with the scene in view of metadata associated with at least one other scene in the media store;
   identifying at least one relationship between a subset of scenes in the media store based on the analysis;
   generating a playlist comprising the subset of scenes based on the identified relationship;
   presenting the playlist to a user;
   recording passive feedback from the user as the playlist is presented, the passive feedback comprising at least an inferred emotional reaction by the user as recognized by reading the user's facial expressions using an image capture device; and
   updating the playlist based at least on the passive feedback.

18. The method of claim 17, further comprising receiving active feedback from the user as the scene is presented.

19. The method of claim 18, the act of receiving active feedback further comprises receiving at least one of a touch input, a typed input, a mouse input, or a voice input.

20. The method of claim 18, further comprising at least one of the following acts:
   analyzing at least one of the passive feedback or active feedback;
   evaluating a relationship between the metadata and either one of the passive feedback or the active feedback; or
   generating a playlist of stored scenes based upon the relationship.

21. The method of claim 20, the act of generating a playlist comprises at least one of selecting a scene based on the presence of a face in the scene, selecting a scene based on the absence of a face in the scene, selecting a scene based on the presence of an item in the scene, selecting a scene based on the absence of an item in the scene, selecting a scene based on a voice in the scene, selecting a scene based on the absence of a voice in the scene, selecting a scene based on a mood of the scene and selecting a scene based on the theme of the scene.

22. The method of claim 21, the act of evaluating a relationship further comprises computing a similarity score for the relationship based upon the metadata that comprises information concerning at least one of a present face, a present item, a present voice, a present mood, or a present theme.

23. The method of claim 21, the act of generating a playlist further comprises placing a scene identifier in the playlist.

24. The method of claim 20, the act of generating a playlist further comprises creating a playlist of disparate scenes based at least one of the passive feedback or the active feedback.

25. The method of claim 17, the act of updating the playlist comprises at least one of adding a scene to the playlist or removing a scene from the playlist.

26. The method of claim 20, further comprising navigating the playlist based upon at least one of the passive feedback, the active feedback, additional passive feedback, or additional active feedback.

27. The method of claim 26, the act of navigating the playlist comprises at least one of moving forward in the playlist, moving backward in the playlist, or displaying a media item related to the scene.

28. The method of claim 20, further comprising navigating the scene based upon at least one of the passive feedback, the active feedback, additional passive feedback, or additional active feedback.

29. The method of claim 28, the act of navigating the scene comprises at least one of moving forward in the scene, moving backward in the scene, changing the rate of scene traversal, pausing the scene, or displaying a media item included in the scene.

* * * * *